(12) United States Patent
O'Brien et al.

(10) Patent No.: US 7,945,511 B2
(45) Date of Patent: May 17, 2011

(54) METHODS AND SYSTEMS FOR IDENTITY AUTHENTICATION

(75) Inventors: Richard J. O'Brien, Lisle, IL (US); Andrew M. Gallant, Rockville, MD (US); John T. Condon, Hoffman Estates, IL (US); Jordan S. Firfer, West Hartford, CT (US); Lawrence F. Buettner, Long Grove, IL (US)

(73) Assignee: Payment Pathways, Inc., Lisle, IL (US)

( * ) Notice: Subject to any disclaimer, the term of this patent is extended or adjusted under 35 U.S.C. 154(b) by 395 days.

(21) Appl. No.: 11/592,510

(22) Filed: Nov. 3, 2006

(65) Prior Publication Data

US 2007/0106612 A1      May 10, 2007

Related U.S. Application Data

(63) Continuation-in-part of application No. 10/786,023, filed on Feb. 26, 2004.

(60) Provisional application No. 60/733,982, filed on Nov. 3, 2005.

(51) Int. Cl.
*G06Q 40/00* (2006.01)

(52) U.S. Cl. .......................................... 705/39

(58) Field of Classification Search .................... 705/35, 705/39–44, 53, 64, 67, 70–79; 725/5; 902/8–24
See application file for complete search history.

(56) References Cited

U.S. PATENT DOCUMENTS

| | | | |
|---|---|---|---|
| 5,677,955 A | 10/1997 | Doggett et al. | |
| 6,856,975 B1* | 2/2005 | Inglis | 705/51 |
| 2002/0111886 A1* | 8/2002 | Chenevich et al. | 705/30 |
| 2003/0089768 A1* | 5/2003 | Page | 235/379 |
| 2003/0126075 A1* | 7/2003 | Mascavage et al. | 705/39 |
| 2004/0059672 A1* | 3/2004 | Baig et al. | 705/40 |
| 2004/0143552 A1* | 7/2004 | Weichert et al. | 705/64 |
| 2004/0148252 A1 | 7/2004 | Fleishmanh | |
| 2005/0149439 A1 | 7/2005 | Suisa | |

OTHER PUBLICATIONS

Handlin et al., "Remittances and the Unbanked", Chicago Fed Letter, n175A, pp. 1-4, May 2002.*
International Search Report, PCT Appln. No. PCT/US06/43173, Jul. 21, 2008.

* cited by examiner

*Primary Examiner* — Mary Cheung
(74) *Attorney, Agent, or Firm* — Troutman Sanders LLP

(57) ABSTRACT

The Greenlist tool provides payors desiring to pay a merchant a means to locate, validate and effect the transfer of assets to another party by routing transaction requests to a third party that functions as the transaction enabler. This task is performed without divulging confidential information about transactors while assigning liability for certain risk consequences to the lowest cost risk bearers: banks. Greenlist verifies identities before making financial transactions or before obtaining access to restricted information. The Greenlist can be completely trusted by risk-bearers. Liability for risk can be transferred to the registrars of the information contained within the registry. This liability transfer substantially reduces the payor's cost of bearing risks. Banks or third parties responsible for certifying that someone or some entity claiming to be an authorized party is not an impostor can now offer new levels of service at a substantially lower cost for a variety of transactions.

11 Claims, 7 Drawing Sheets

METHODS AND SYSTEMS FOR IDENTITY AUTHENTICATION

CROSS REFERENCE TO RELATED APPLICATIONS

This application claims the benefit of U.S. Provisional Application No. 60/733,982, filed Nov. 3, 2005, and is a continuation-in-part of U.S. patent application Ser. No. 10/786,023, filed Feb. 26, 2004. The entire contents of those applications are incorporated herein by reference.

FIELD OF INVENTION

This invention relates to a computer system and method of authenticating identities for making transactions, such as making payment deposits, or for obtaining access to restricted information, without the need for security or encryption devices.

BACKGROUND

In today's fast paced computer dependent world, people make purchases, payments, deposits, and other financial transactions without the exchange of traditional money, checks, or even the simple act of handing a teller a credit or debit card. Many transactions made by individuals today are done over the telephone or Internet. To accomplish this, people must submit unique identifiers in order for their preferred payment instruments to be accepted and activated. Such identifiers include the person's name, address, credit card number, CVS number, and frequently, a PIN or "shared secret" such as a mother's maiden name or family pet's name. Identifiers can quickly become dispersed among several credit card company databases, healthcare databases, mortgage company databases, and on-line merchant databases. These identifiers may be transferred over a wireless network or a portion of the Internet, which may make them vulnerable to be copied in transit. These identifiers may be captured by spy-ware sending keystrokes on a computer to a thief lurking in any corner of the world.

It is not unusual in the course of a consumer's relationship with a bank, a healthcare provider, an insurance company, a merchant or a credit card company for him to need to access his account records. It might be to dispute a payment, to prove a payment was made, to verify an order, or to simply check an account balance. To gain access to his records a person must provide his unique identifier information to validate his identity. In certain healthcare circumstances, only a person's duly authorized physician may access a healthcare provider's databases containing his medical records.

With so many in-person enrollments and on-line registrations for various utility companies, on-line merchants, and banking and healthcare providers, it is a common practice for people to use the same passwords, PINs, and "shared secrets," so they can remember what to provide should they someday need access to a certain database. An unintended byproduct of the dispersal of a person's unique identifiers among so many locations is the emergence of identity theft crime. Once a weak link in the chain of trust breaks, a fraudster can appropriate an identity and direct an unauthorized flow of funds.

Depending on the payment instruments used, detection of this illegal activity might not occur for several days, weeks, or even months. There is not a priori notification to the true owner of such unique identifiers that access to information is being sought because it is assumed that the person gaining access to such information IS that person. Economic harm is not the only kind of harm wrought by fraudsters. For instance, illegal access to health records can prevent a job hire, cancel an insurance policy, or restrict freedom of movement.

Therefore, there remains a need in the art for an easy and convenient system and method for validating another person's identity without the need for security or encryption devices. There also is a need in the art for notifying a person when authentication of their identity is made, by whom, and for what purpose. There is a need to deeply validate identity involving access to restricted records such as digital signatures of the registrar-institution that deposited the person's unique identifiers. There is the need for banks and healthcare institutions to obtain proof that information's accuracy is protected by a liability contract. There is a need for individuals to be able to know about and approve transactions that can involve private aspects of their identity.

User concerns that need to be addressed are:

How can I be SAFELY identified on Internet?

Who's willing to vouch for me to third parties?

Shouldn't I be informed when my information is sought, by whom and for what purpose?

How do I know what's known about me, by what entities, and how is their knowledge cloaked or hidden?

Privacy Rights Management is a new industry. Numerous registries of identities exist today and identifiers can be correlated among them. There is a need for information to flow to consumers when such correlations happen so they can approve the use of their private identifiers.

This need in the art extends but is not limited to specific communities of interest wherein access to information, or approval of a transaction involving transfer of a financial or information asset, is an essential element. This is a key part of interactions between various users, consumers, businesses, agencies, regulators, and/or other interested parties. These interactions may include validation and authentication for instances such as:

approving access for review purposes to financial, health care, subscription, personal, or other information;

determining identity-related status for shipping and receiving of physical items;

determining suitable status for the transfer of tokens and access rights for digital products;

for eligibility to view and print tickets, reservations, airline boarding passes, or other digital documents; and for determining authenticity of source when material for publication or edits to web-knowledge repositories such as Wikipedia is submitted by persons whose identities are not hidden or partially obscured, but true.

Finally, there is a need in the art to mediate between public and private aspects of potentially shared information. In particular, there is a need for identifiers that enable access and transactions while preserving privacy and protecting information. This includes identifiers that are suitable for public exposure, for direct use (e.g., the "one-way" public payment addresses known as Linked Credit Account or LCA and others of its class of payment addresses having similar one-way characteristics), or for indirect use (e.g., simply as an identifier solely used to initiate authentication processing). It also includes healthcare identifiers used to access personal healthcare information (PHI) for individuals, as well as identifiers and related transactions relevant to other communities of interest.

SUMMARY

It is an objective of the present invention to provide individuals and institutions with an easy and convenient way to authenticate identities for transactions to receive payment and credit or for actions to obtain access to restricted information.

Another objective of the present invention is to establish a system that accepts authenticated identities without the need for security or encryption devices.

It is a further objective of the present invention to utilize the particular types of identity in conjunction with various accounts for financial transactions or for accessing restricted information.

It is a further objective of the present invention to utilize the particular types of identity in conjunction with various systems or networks for financial transactions or for accessing restricted information.

It is a further objective of the present invention to utilize the particular types of identity in conjunction with financial systems and networks worldwide.

These and other objectives of the present invention will be apparent in the following description.

The identities and transactions embodied in this invention are applicable to banks, customer payment addresses, and making and receiving payments; to healthcare providers, healthcare identifiers of individuals, and access to healthcare information records; and for other communities of interest, their respective identity/authentication providers, subscriber identifiers, and transactions relevant to their respective community. This invention preferably includes the use of ENUM technology to associate phone numbers with respective identifiers (such as certain payment addresses) in public systems (such as the DNS) or in private systems.

In one aspect, the invention comprises an Identity Authentication Bureau that functions as a registry that lists identifiers in a directory that has both open and restricted access. This registry is referred to herein for convenience as "Greenlist." It is designed for third parties to use to verify identities for making financial transactions or for obtaining access to restricted information. Third parties function as transaction enablers. These entities bear certain risks of negative consequences when one party is not who or what it claims to be. One unique characteristic of the Greenlist registry (or directory of identifiers) is that it can be completely trusted by risk-bearers. This trust can be established with certainty. Liability for risk can be transferred to the registrars of the information contained within the registry. This liability transferal substantially reduces the cost of bearing risks. Third parties responsible for certifying that someone or some entity claiming to be an authorized party is not an impostor can now offer new levels of service at a substantially lower cost for a variety of transactions.

Trust in the Greenlist can be "constructed" with Digital Signatures as specified by liability and fraud-protection contracts. Various entities can define and create their communities of interest by authorizing their banks to function as registrars and supply record access information in an extension of ENUM, the Internet standard method for using phone numbers in the Internet's Domain Name System. Telephone Number Mapping (ENUM or Enum, from TElephone NUmber Mapping) is a suite of protocols to unify the telephone numbering system E.164 with the Internet addressing system DNS by using an indirect lookup method, to obtain NAPTR records. The records are stored at a DNS database.

In the VoIP context (making phone calls via the Internet), ENUM has been used as follows: if a calling party on the PSTN network or the Internet identifies a called party ENUM number by the called party's E.164 number, that E.164 number will be translated at the ENUM gateway into the corresponding URI. This E.164 number will be used to look up and fetch a NAPTR record obtaining the URI that indicates the called party's instructions for how the call should be forwarded or terminated. The registrant (the called party) has specified in the 'NAPTR record', "Naming Authority Pointer Resource Records" as defined in RFC2915 (superseded by RFC 3403), and the URI it contains, such as e-mail addresses, a fax number, a personal website, a VoIP number, mobile telephone numbers, voice mail systems, IP-telephony addresses, web pages, GPS coordinates, call diversions or instant messaging.

ENUM technology is being used in a range of public and private environments. Records stored in the DNS are accessible via public queries. Records stored in private databases using DNS and ENUM technologies have controlled access. VoIP is an example of an ENUM-enabled application, wherein an application uses ENUM to map a phone number to a URI for a service that the application can then use to perform its services.

Use of ENUM as a directory service infrastructure makes ENUM more valuable as a public resource. The Identity Authentication Bureau, Greenlist, can be accessed directly for public identity information such as a public payment address, as described in U.S. patent application Ser. No. 10/786,023, filed Feb. 26, 2004. The present invention comprises an improvement on the "publicly available" aspects discussed in U.S. patent application Ser. No. 10/786,023. The Greenlist provides, for each user, a webpage that payors (or others) can access. Different payors, and risk bearing enablers of transactions, via digital certificates or other means of identification, may be allowed to view different information (for example, an insurance provider may be able to access a social security number). Also, the Greenlist operator provides assurance that the payee is who he says he is and his specified payment address is true.

The Greenlist acts as a virtual safe deposit box, where identity information may be deposited and withdrawn without need for data replenishment. Withdrawals can be made by simple database lookup conventions. Information that needs to be certified as true and vouched for by registrar entities willing to transfer liability for risk bearers, may or may not be derived from the external processes described, for example, in U.S. Pat. App. Pub. No. 2005/0259658, filed Aug. 6, 2005. All information may be trusted as true because identity information can only be removed or modified by the original depository institution that is liable for its accuracy and currency.

Some identity information may be withdrawn only by members of a community of interest. When a bank performs a mobile authentication step, owners of that record for the Payor and Payee are notified in the manner of preference as specified during enrollment (e.g., email, fax, voice messaging, or instant messaging). Different communities of interest can use the Greenlist to enable authenticated access or authenticated transactions, e.g., for granting digital rights, for receiving shipments, or for printing documents such as tickets or boarding passes.

In one aspect, the invention comprises a system for authenticating a payor and a payee in an electronic fund transfer, comprising: a bank computer linked via a computer network to a payor's computer and a directory computer, the payor having at least one account at the bank and having been authenticated to the bank computer; wherein the directory computer is operable to maintain a first database of authenticated registrant information comprising authenticated information for the payee identifying at least one linked credit account of the payee and to provide a portion of the first database via the computer network to the bank computer on periodic basis, the portion comprising the authenticated information for the payee; wherein the bank computer is operable to maintain a second database comprising data from the portion of the first database and further comprising ENUM data for registrants in the portion of the first database; and wherein the bank computer is operable to receive ENUM information and payment information from the payor computer identifying the payee, map the information identifying the payee to the linked credit account of the payee using the portion of the first database, and transmit a payment from the payor's at least one account to the payee's linked credit account.

In another aspect, the invention comprises a method of authenticating a payor in a financial transaction, comprising: (a) receiving, via a computer network, information comprising linked credit account information and telephone number information from a payee who has an account at a first bank and who has been authenticated; (b) associating via a computer of the first bank the linked credit account information and telephone number information of the payee with a URN; (c) transmitting information comprising the telephone number information and the associated URN to a database in communication with a computer of a second bank; and (d) electronically receiving funds from a payor account to the linked credit account.

In another aspect, the invention comprises a method of authenticating a payee and a payor in a financial transaction, comprising: (a) receiving via a computer network payee phone number information from a payor who has an account at a bank and who has been authenticated; (b) associating via a computer linked to the computer network the payee phone number information to linked credit account information of the payee using ENUM; (c) transmitting to the payor via the computer network verification that the telephone number has been associated with the linked credit account information of the payee; (d) receiving via the computer network authorization from the payor to transfer funds from the payor account to the linked credit account; and (e) electronically transferring the finds from the payor account to the linked credit account.

In another aspect, the invention comprises a method of providing authentication, comprising: (a) receiving authenticated registrant comprising a registrant telephone number and registrant account information; (b) storing the registrant information in an electronic database accessible by a computer in communication with a computer network; (c) associating the registrant information with ENUM data; (d) transmitting the registrant information to a directory computer; and (e) transmitting the associated information to a directory user.

In various embodiments: (1) the directory user is a bank; (2) the directory user is a health care institution; (3) the registrant account information comprises a linked credit account; and (4) the associated information comprises personal health care information.

In another aspect, the invention comprises a system for authenticating a sender and a receiver in an asset transfer, comprising a bank computer linked via a computer network to a sender's computer and a directory computer, the sender having at least one asset account at the bank and having been authenticated to the bank computer; wherein the directory computer is operable to maintain a first database of authenticated registrant information comprising authenticated information for the receiver identifying at least one linked account of the receiver and to provide a portion of the first database via the computer network to the bank computer on periodic basis, the portion comprising the authenticated information for the receiver; wherein the bank computer is operable to maintain a second database comprising data from the portion of the first database and further comprising ENUM data for registrants in the portion of the first database; and wherein the bank computer is operable to receive ENUM information and payment information from the sender computer identifying the receiver, map the information identifying the receiver to the at least one linked account of the receiver using the portion of the first database, and transmit an asset transfer from the sender's at least one account to the receiver's at least one linked account.

In various embodiments: (1) the bank is a licensee of the directory computer; (2) the linked account is an identifier, encodable as a URN, of the receiver; (3) the payment information comprises information identifying the receiver; (4) the asset transfer actually transfers an asset or transfers ownership thereof from the sender to the receiver; (5) the asset is a payment or financial instrument; (6) the asset is a digital construct; (7) the asset is one or more physical objects; and (8) the asset is information, right or access permission.

DETAILED DESCRIPTION

Figure 1:
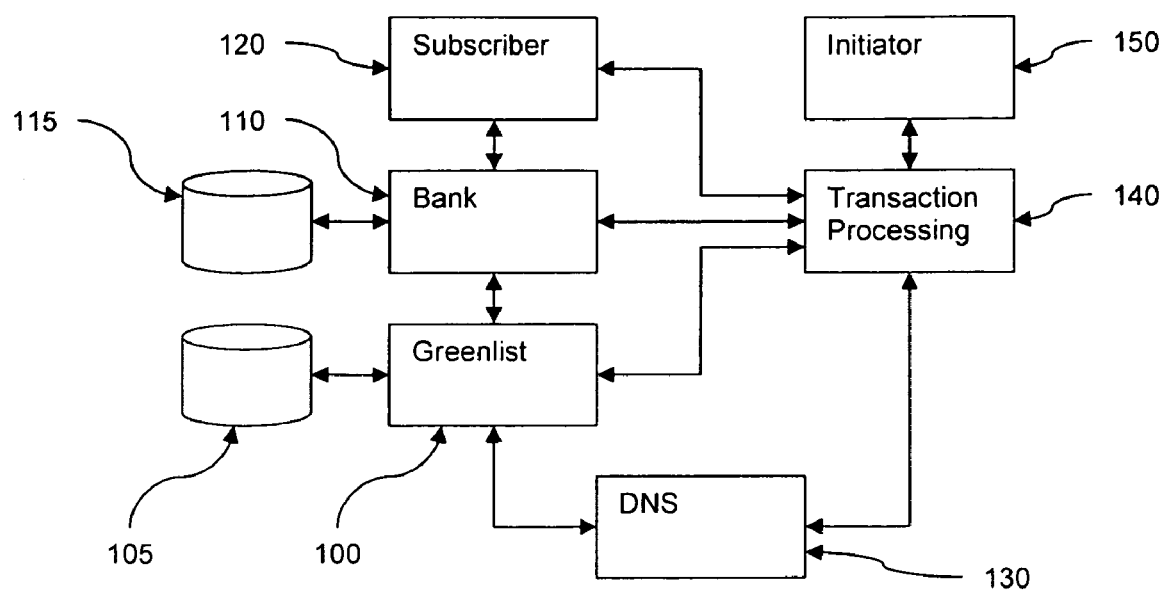
FIG. 1 is a diagram showing preferred components of a system embodiment of the invention.

FIG. 1 is a diagram showing preferred components of a system embodiment of the invention. Greenlist 100 is a set of directory and processing systems. The Greenlist maintains databases 105. A bank 110 that enrolls with the Greenlist may offer Greenlist subscriptions to customers. Bank 110 maintains its own databases 115.

A Greenlist subscriber 120 may opt for ENUM functionality: the Greenlist subscriber is an ENUM registrant, the bank and the Greenlist handle ENUM registration, and the subscriber's phone number (as a domain name) is entered in the Internet's Domain Name System, commonly referred to as the DNS 130. Alternatively, the subscriber's phone number (as a domain name) may be entered in an analogous system, e.g., for private ENUM, possibly with controlled access.

A payment (or other) transaction may be performed by a transaction processing system 140. The transaction may be initiated by an initiator 150, such as a payor, a payee, or a third party. The initiator 150 may (or may not) be a Greenlist subscriber choosing to initiate a transaction with another Greenlist subscriber 120.

The transaction processing system 140 may discover that the transaction will require the involvement of or certain information about a Greenlist subscriber 120. Instances may include (but are not limited to) the following: a payee may be notified that a payment has been received, thus allowing for purchased goods to be shipped; a payor's preferred notification methods and public payment address may be needed so that the payor can authorize the payor's bank to make a payment from an associated non-public account.

The transaction processing system 140 may satisfy its information and processing requirements related to a Greenlist subscriber 120 by first placing an ENUM query via the DNS 130 using the subscriber's phone number to retrieve a Greenlist identity for the subscriber. The system 140 may then interact with the bank's systems 110 as needed. In one instance, the bank 110 may interact with a subscriber 120 who is a payor in order to receive authorization to make a payment.

Once the transaction processing system 140 has satisfied its information and processing requirements related to a Greenlist subscriber 120, possibly involving ENUM-enabled applications that may query systems such as the DNS 130, it can complete the transactions and return status notification to the initiator 150.

When a subscriber 120 enrolls with a Greenlist Bank 110, the subscriber may be assigned one or more identifiers related to a transaction processing system 140 associated with a particular community of interest. These identifiers may be public or private. Such an identifier may be encoded as a "name" (more formally, as a Uniform Resource Name). Further, such an identifier may be associated with the subscriber's phone number for retrieval from the DNS 130 or analogous public or private system (more formally, through the use of the NAPTR Resource Record, as described in the Terminology section below).

A particular example is the use of a public payment address, such as a Linked Credit Account (LCA), which may be retrieved by an ENUM query of the DNS using a phone number as the starting point, and leading to a payment transaction facilitated by the Greenlist 100 and the bank 110.

In one aspect, this invention comprises elements and functions that can be grouped into three conceptual layers. The outer layer, the Transaction/Consumer Layer, is closest to the consumer. The intermediate layer, the Enrollment Layer, makes the consumer a conceptual part of the infrastructure. The innermost layer, the ENUM/Greenlist Layer, is the conceptual infrastructure for the system of the invention.

I. Transaction/Consumer Layer (Also Merchant Layer and Small and Medium Business-SMB Layer)

This outer layer, for financial transactions, is comprised in one embodiment of users' banks seeking to discover validated payment addresses so that money can be sent between banks in a more efficient manner than that of the current payments model. This is accomplished by querying the GreenList.

In one embodiment, the user does not need to know that any ENUM-enabled directories are queried because this is accomplished by his bank acting as his proxy. The user only experiences his bank's on-line banking portal, which might have a pull-down tab offering him search options to discover his friend's payment address. All he really knows or cares about is his trust relationship with his personal bank. The very act of presenting a search tool and a result implies that payment address validation has been accomplished to the satisfaction of a bank. This trust relationship is already present between a consumer and his personal bank before the consumer asks his bank to enroll him in the Identity Bureau.

The user can enroll for mobile authentication features through the Greenlist Web Portal.

The features of mobile authentication include the following:

a.) they can be activated for his existing bank account;
b.) they can be activated for his proxy Greenlist bank account while he retains his true bank account at another bank; and
c.) they can specify a separate receive-only payment address in addition to activating powerful mobile authentication features.

When the user's enrollment is complete, he is said to have (or to have been) "enrolled" in the GreenList. He has been "GreenListed."

II. Enrollment/Bank Layer (Also Bank Clearinghouse Layer and Healthcare Clearinghouse Layer)

This layer is where many linkages occur. It is the enrollment, registration, and provisioning layer for the user. This layer assigns a Greenlist account number for the user who enrolls in the GreenList so that he can then make mobile-authenticated e-payments. This layer also functions as an ENUM Registrar, or works with the user's existing ENUM Registrar on his behalf, for subsequent provisioning of his GreenList enrollment information into his ENUM domain (maintained by his ENUM Tier II Provider, described below).

A bank may take this additional step for its customers (registrants) when it wishes its customers to be able to receive e-payments from other persons who are banked at other banks and who have registered in other Greenlist payment systems. The GreenList bank may digitally sign the "Payload" that it is provisioning into the user's ENUM domain.

In the case when the user does not already have his phone number registered for ENUM, the bank can act on behalf of the user as an ENUM Registrar, or as his agent with an existing ENUM Registrar. This process "registers" the user's phone number into ENUM and sets up the relationships for the user's ENUM domain to be maintained by an ENUM Tier II Provider. Once this is in place, the GreenList bank acting as or via an ENUM Registrar can provision the user's GreenList "Payload" information into the user's ENUM domain as maintained by his ENUM Tier II Provider.

III. ENUM/Greenlist Layer

This is the conceptual layer providing the information infrastructure. This layer contains ENUM domains, maintained by users' ENUM Tier II Providers, and is managed subject to standards certified by the ENUM CC1 LLC. This layer also can be called the GreenList Root Layer since it contains the Greenlist, maintained by the GreenList bank.

Terminology

This section explains how certain terms are used in this description.

ENUM is Electronic NUMbering, an IETF Protocol, described in RFC 3761.

An ENUM Subscriber is the assignee of an E.164 number who has agreed to register that E.164 number for insertion and use as a domain name in the Internet DNS and who subsequently requests population of its ENUM domain with certain DNS resource records containing data associated with that E.164 number. This data consists of Uniform Resource Identifiers (URIs), such as web addresses, and each such URI is contained in its own Naming Authority Pointer DNS (NAPTR) Resource Record. It is these NAPTRs that are populated into the subscriber's ENUM domain, and it is the subscriber's ENUM Tier II Provider that hosts and operates his ENUM domain. The ENUM subscriber has full control over the provision and content of the NAPTR resource records in the ENUM domain for the E.164 number.

An ENUM User is a person or entity who is querying the DNS about an E.164 number, typically using an ENUM-enabled Application Client or an ENUM Client, in order to retrieve DNS resource records associated with the E.164 number. The ENUM User will generally be aware only of the application and not of the use of ENUM by the application.

An ENUM Registrar can do many things, but minimally it must register the user's phone number into the Domain Name Server/Service (DNS). In this document, the ENUM Registrar for an ENUM Subscriber will be viewed as the primary point of contact between the ENUM Subscriber and the DNS, and acting on the ENUM subscriber's behalf, handles and coordinates the processes of registration of the phone number for ENUM, setting up the ENUM domain for the phone number, and populating that domain with the DNS resource records that are associated with that phone number.

An ENUM Registrant is the telephone number assignee, the ENUM Subscriber.

An ENUM Tier II Provider is an entity that operates the ENUM domain for the ENUM Subscriber within the Internet DNS. The ENUM Tier II provider is responsible for maintaining the ENUM Subscriber's DNS resource records.

An E.164 Number is a telephone number that contains an E.164 telephone country code, and that can be dialed on the public telephone network. "E.164" refers to ITU-T Recommendation E.164, "The international public telecommunication numbering plan." In this document, "phone number" and "telephone number" may be taken to refer to E.164 numbers, which are the phone numbers used for ENUM.

A URI, or Uniform Resource Identifier, is described in RFC 3986. A URI identifies a resource on the Internet. There are two kinds of URIs. The more common is the URL, or Uniform Resource Locator, and it identifies a service and location on the Internet, e.g., http://www.paementpathways.com. The other is used as a name, the URN, or Uniform Resource Name. The ENUM protocol allows an ENUM subscriber to associate the ENUM subscriber's phone number with URIs for end users to obtain from the DNS. Typically, such URIs may be used to provide specific service-related contact information that could otherwise be found on a business card, including email addresses, web pages, and SIP addresses for VoIP phone calls. URNs have been used for a range of other kinds of applications, including for identifying publications by encoding the International Standard Book Number (ISBN), in public systems, and for financial messaging by encoding the Society for Worldwide Interbank Financial Telecommunication (SWIFT) address in private systems.

An ENUM Service is a protocol element of the ENUM protocol. It describes the Internet-based service for which a URI may be used.

A NAPTR is a Naming Authority Pointer DNS Resource Record described in several RFCs. ENUM uses NAPTR records. Each NAPTR record is identified by the ENUM domain name of a phone number. Each NAPTR record contains one URI along its ENUM Service.

An ASP is an Application Service Provider, which is in general responsible for a particular URI related to an ENUM Subscriber. For example, the ENUM Subscriber could have a home page on the web that is hosted by a particular ASP. The URI for that web page (in other words, the http address of the page) may be put into a NAPTR in the ENUM Subscriber's ENUM domain. Then an ENUM user could query the subscriber's phone number and get back the address of the subscriber's home page in return.

The Greenlist is the Identity Authentication Bureau described herein, which enables third parties to verify identities for making financial transactions or for obtaining access to restricted information. There is an enrollment process for putting identities into the Greenlist.

The Greenlist Registry is responsible for maintaining the Greenlist database and for maintaining appropriate relationships with the following:

1.) ENUM Registrar: agent who registers the phone number of the GreenList enrollee into ENUM;

2.) ENUM Tier II Provider: agent who manages the ENUM domain of the GreenList enrollee and who populates the enrollee's NAPTR records into ENUM;

3.) GreenList Enroller ASP: agent who assigns the enrollee's GreenList payment address and who thus creates the contents of the NAPTR; and 4.) GreenList ENUM Agent: agent who has a contractual (liability transfer) relationship with a GreenList Enroller. The purpose of the relationship is to provision the contents of a NAPTR, the "signed" public Payment Address (that goes along with a Bank Account), into the ENUM domain of the enrollee so that it can be searched by those having access to ENUM. The act of "signing" digitally a public Payment Address that originates at a bank is the assurance that ENUM records that are appropriately "signed" can indeed be trusted as true.

The Greenlist Enrollment Process is the process followed by an entity that chooses to have an identity entered into the Greenlist.

The ENUM Registration Process is the process followed by an ENUM Registrant to have his number entered into ENUM.

The ENUM Query Process is the process of using the ENUM protocol to issue a DNS query for a phone number and receiving in return the NAPTR Resource Records, if any, associated with that phone number.

A Transaction Identity Authentication Process is the process of verifying an identity by first using ENUM to retrieve public Greenlist information related to a phone number, and then accessing the private Greenlist, in order to authenticate an identity.

A Linked Credit Account can be a bank account that is designed to filter most or all debit ACH instructions. It is linked to a normal checking account and owners can instruct their bank regarding the frequency with which funds can be "swept" to their traditional bank account, which may or may not be located at the same institution as the LCA. When the Greenlist is used to resolve certain public identifiers to locate a safe, public payment address, it functions as a doorway that only allows funds to travel in one direction, thereby creating a one-way account. No one other than the client can withdraw funds from the Linked Credit Account. Any account that has a system for debits and credits can be modified by subtraction by rendering it incapable of being debited or by rendering it filtered to an extent that only a few approved entities can debit it. This means that even telephone accounts can safely become enabled to receive credits (funds) by adding a layer of Linked Credit Account protection that has, in effect, a similar one-way characteristic for the direction funds can flow.

A Greenlist Licensee is also referred to herein as a Greenlist member bank.

Master Directory

This section describes the concepts and workings of the Master Directory. It includes:

Process Descriptions and

Data, Edits, and Lookups.

Behind the Linked Credit Account and the associated messaging is the Greenlist Master Directory ("GMD"). The Greenlist is the authoritative address book for all Linked Credit Account and other bank-registered, debit blocked account holders in the world (e.g., UPICs; IBAN; UIDs etc.). In addition to having its own LCA or UPIC account numbers listed for receipt of funds transfers, a GMD provider may transfer funds to EPN UPIC, UID account number destinations or LCAs at EPN and/or non EPN affiliated banks alike. Common to all forms of Linked Credit Accounts is the requirement that an FDIC insured bank (or a bank's properly designated proxy) MUST submit at least a Greenlist ID # to the Internet accessible Master Greenlist Directory. Because the Linked Credit Account and UPICs are for credit deposit only, the account number may safely be publicly published. The Greenlist Master Directory is the preferred method for publicizing that information.

Characteristics of the Master Directory include:

A publicly published and Internet accessible Master Directory of accounts for payees (billers);

Capability for being deployed over the web either as an independent entity or as an embedded link with pointers within banks' home-banking portal software;

A user interface that is web-enabled and provides for retrieval of bank member data using standard web based search methodologies (e.g., Google);

A GMD provider is the sole authorized publisher of certified LCA account number(s);

Contains payee payment receipt acknowledgment notification preference information;

The Master Directory is designed to be synchronized with all local standalone bank Greenlist directory installations;

Provides a repository for UPIC customer information in addition to the LCA account information;

Highly secured in terms of maintenance and updates to prevent data alteration and miss-direction/interception of funds; and Provides a repository for TripleDES Key Pair information from an authoritative TripleDES Root server source (TBD).

Master Directory Process Descriptions

Figure 2:
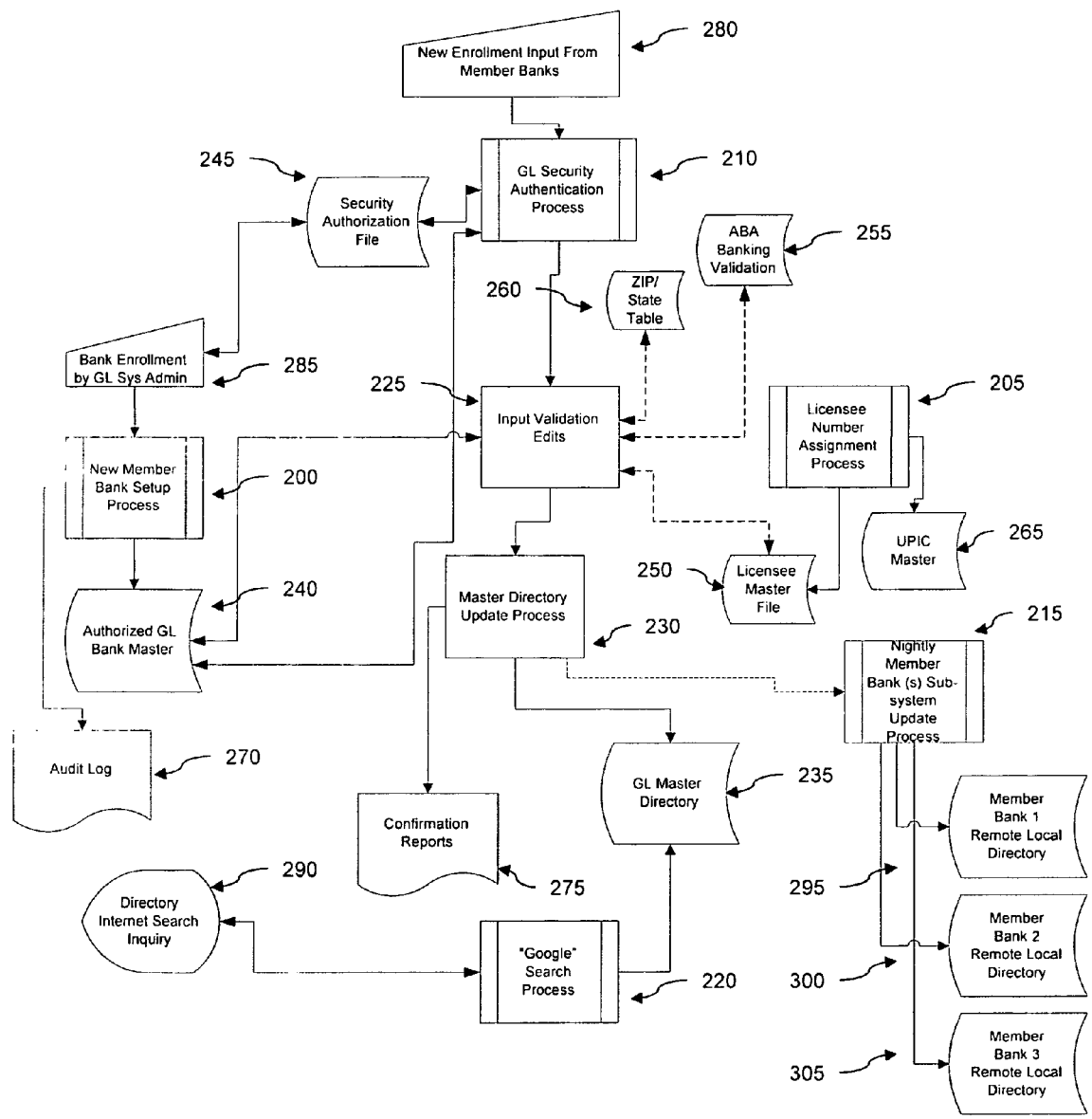
FIG. 2 depicts a preferred Master Directory enrollment process.
Figure 3:
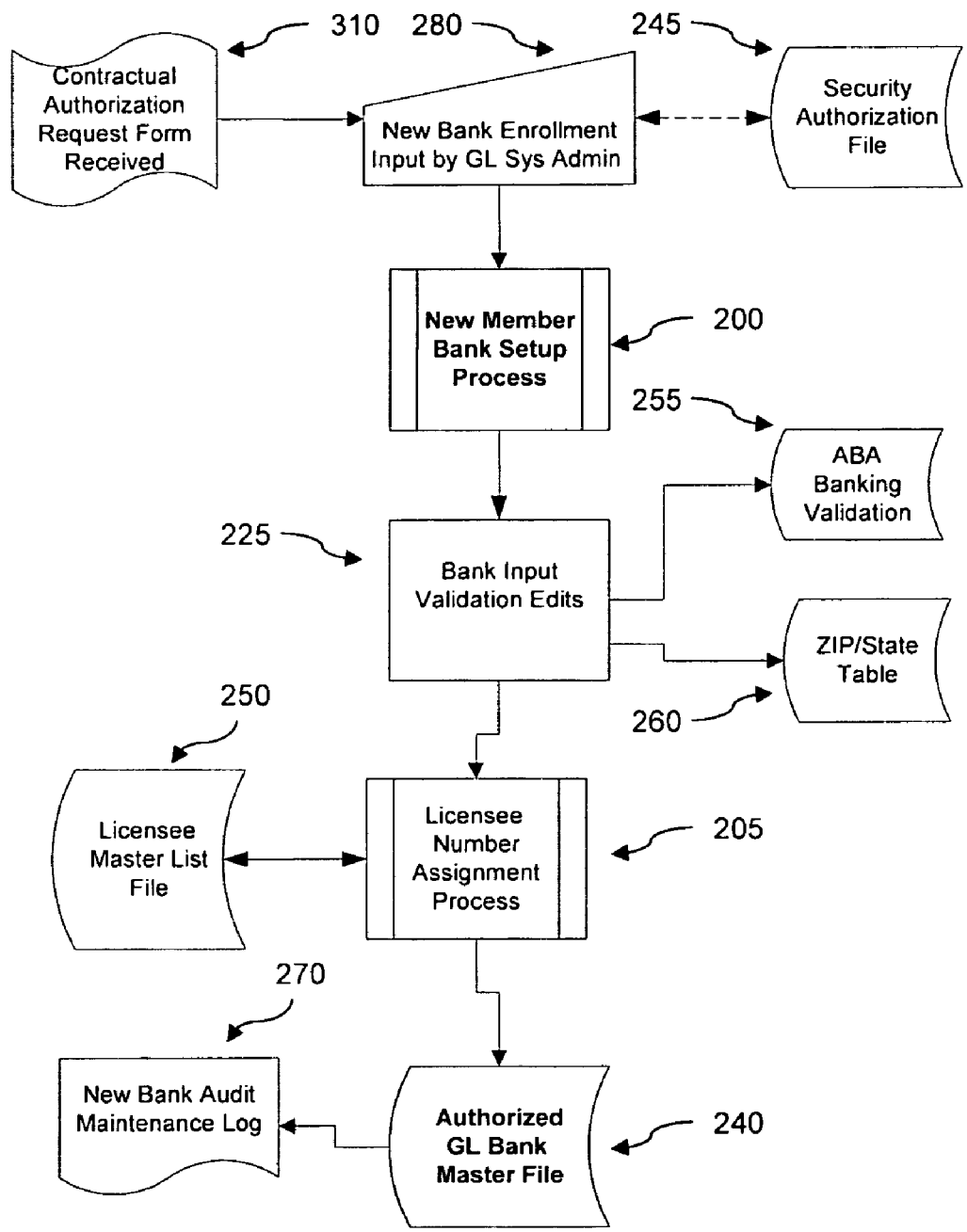
FIG. 3 depicts a preferred Master Directory bank setup/maintenance process.

This section describes processes related to the Master Directory (see FIG. 2). These are:

Setup of a New Bank Member Record in the Authorized Greenlist Bank Master (see FIG. 3).

Modify a Bank Member Record within the Authorized Greenlist Bank Master (see FIG. 3).

Deactivate a Bank Member Record within the Authorized Greenlist Bank Master (see FIG. 3).

Figure 4:
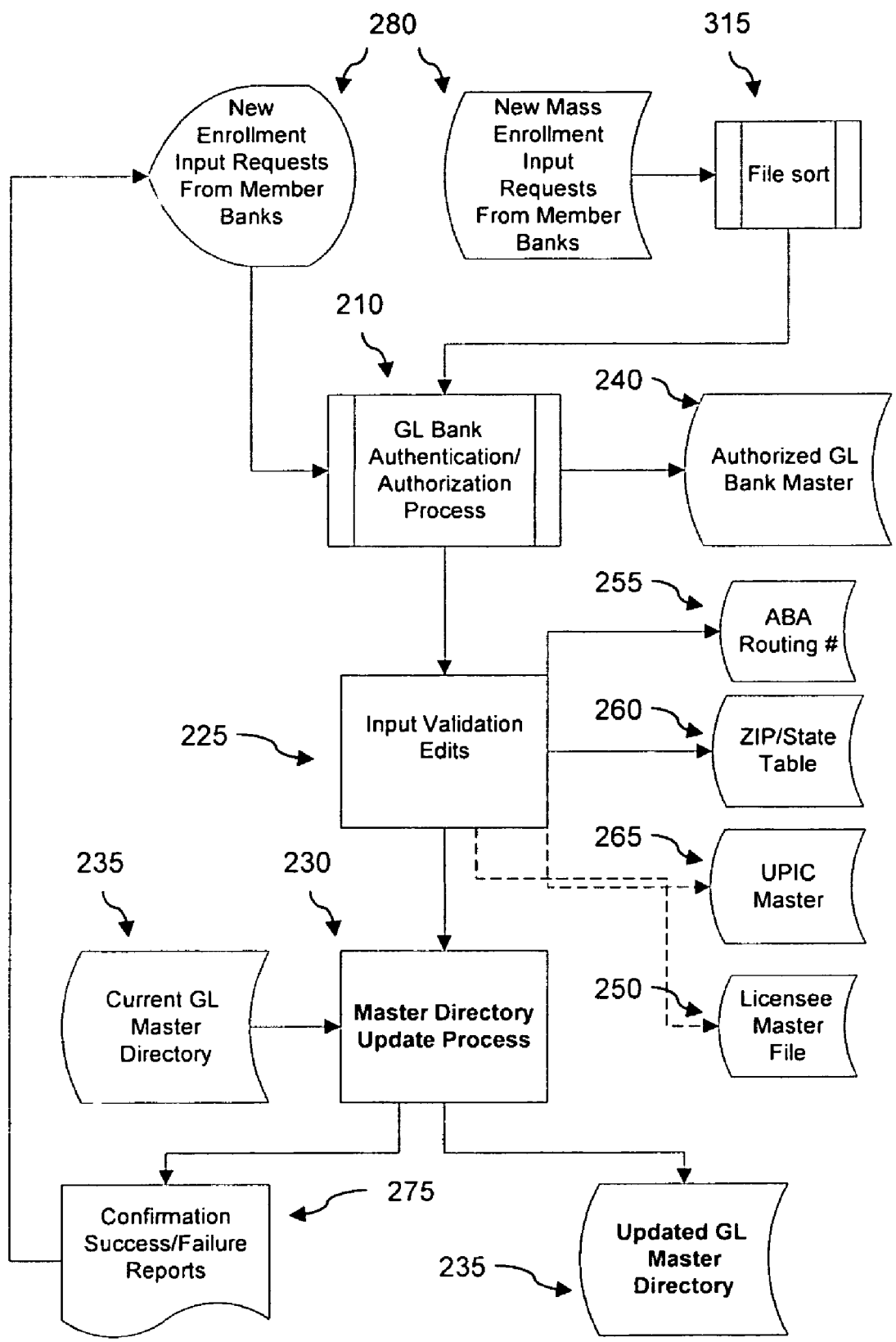
FIG. 4 depicts a preferred Master Directory enrollment/maintenance process.

Provide an Update Mechanism to the Greenlist Master Directory (see FIG. 4).

Figure 5:
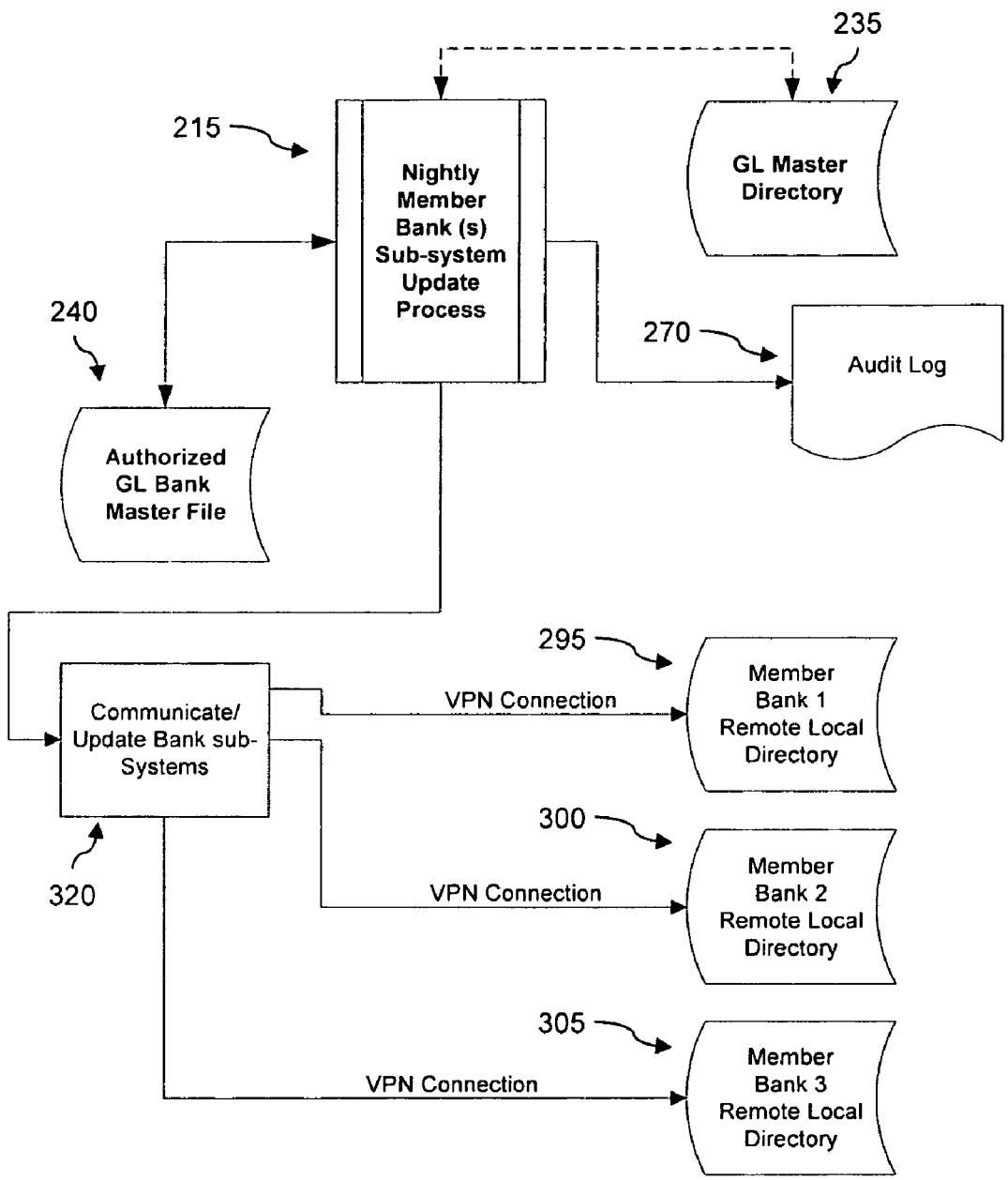
FIG. 5 depicts a preferred bank subsystem Greenlist update process.

Provide Nightly Update Feeds to/from Member Bank-Directory sub Systems (see FIG. 5).

Figure 6:
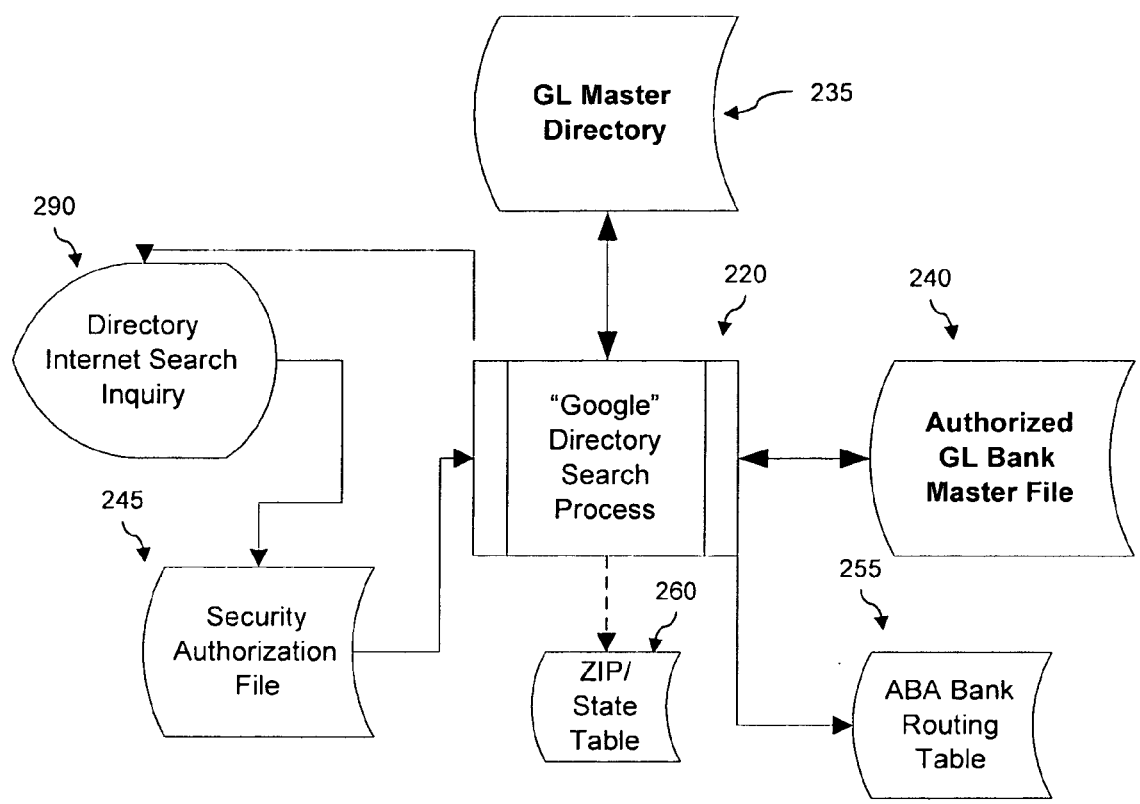
FIG. 6 depicts a preferred Greenlist Internet inquiry process.

Provide Internet Search Capability of the Greenlist Master Directory (see FIG. 6).

Figure 7:
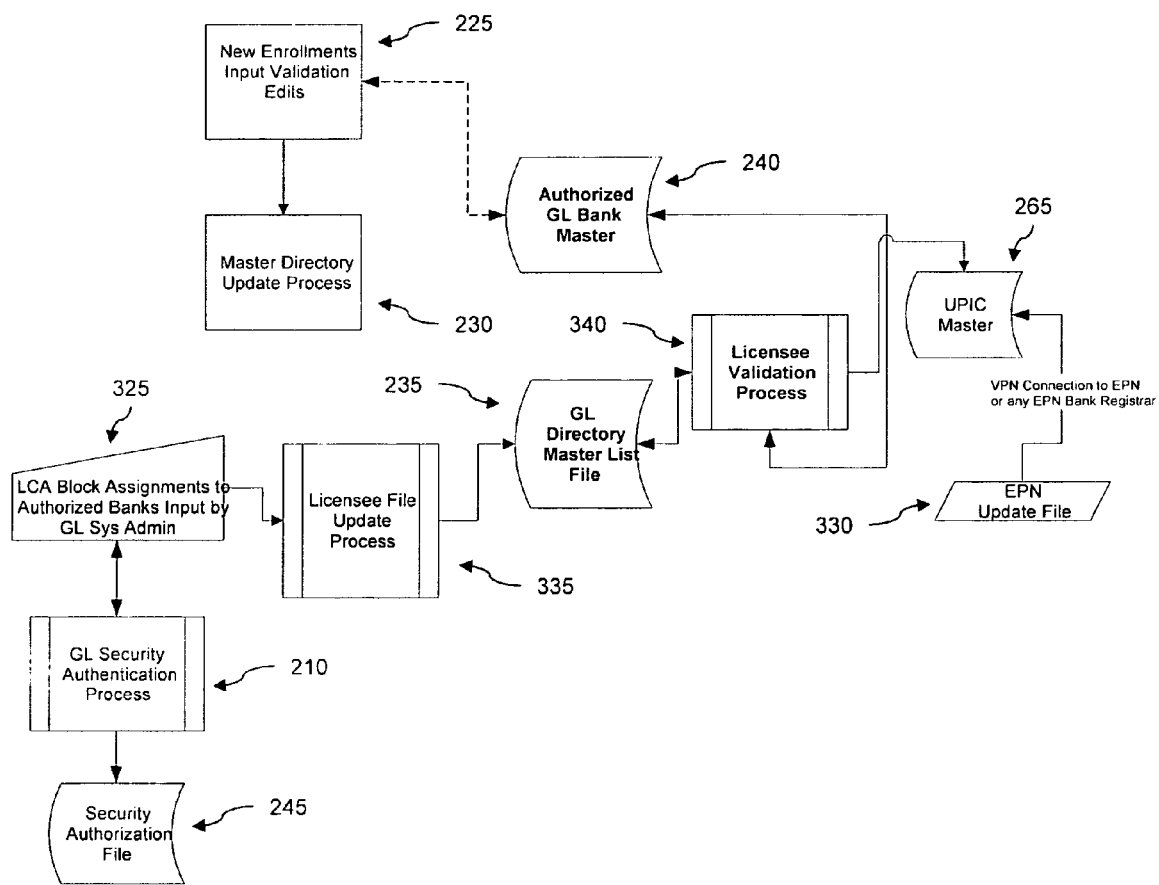
FIG. 7 depicts a preferred Master LCA account assignment/validation process.

Assign a valid LCA account range to a licensed member bank in the Authorized Greenlist Bank Master (see FIG. 7).

These process descriptions provide detailed information about functional aspects related to setting up and using the Greenlist. These descriptions include Input, Processing, Output, Dependencies, and Data.

Setup of a New Bank Member Record in the Authorized Greenlist Bank Master

This process is related to the preferred Master Directory bank setup/maintenance process 200 depicted in FIG. 3.

A) Input
1. Display entry input screen.
   a. Greenlist System Administrator 280 enters their authorization id and password to input information to the Greenlist System.
   b. An action code of add/modify/deactivate is selected.
   c. The input data source is from the bank's Registration Contract agreement 310 between Greenlist and the financial institution. The data element fields of the Bank Profile Database (see below) are populated from information on the Registration Contract.
   d. Registration Contract also includes an identification of the block of linked credit account (LCA) numbers 325 each bank has registered with Greenlist.

B) Processing
1. Verify Greenlist user id. entered with the authorization level within the Security Authorization File 245 to perform add/modify/delete functions for bank profile data.
2. Display data input screen for all of the Bank Profile database data elements 200.
3. Input screens must contain drop down boxes with valid values for specific data fields (e.g., flags for EPN; CHIPS; SWIFT (if applicable)).
4. Check to see that required fields and format are entered.
5. Validate each entry field 225.
6. Verify Greenlist ID account number is a valid number from the Master Greenlist ID Account file for financial institutions 240; or;
7. Verify "LCA number" is a valid Electronic Payment Network (EPN) UPIC account#265, or
8. Verify bank's routing number against file of ABA Route Numbers 255.
9. Validate structure of addresses, city/state/zip combination 260.
10. Verify e-mail address syntax.

C) Output
1. Post entry to Authorized Greenlist Bank Master file 240.
2. Print entry in New Bank Audit Maintenance log 270.
3. Post completion message on entry screen.

D) System Dependencies
1. Bank approved Security System must be in place.

E) Data
1. Data validation sources:
   a. ABA routing # edit validation file 255.
   b. State code validation table 260.
   c. Zip code validation table 260.
   d. CHIPS and SWIFT validation files (if applicable).
   e. EPN UPIC master account # list (if applicable) 265.
2. Data populated/maintained
   a. Authorized Greenlist Bank Master file 240.

Modify a Bank Member Record within the Authorized Greenlist Bank Master

This process is related to the preferred Master Directory bank setup/maintenance process 200 depicted in FIG. 3.

A) Input
1. Greenlist Administrator enters action code (add/modify/delete) and Bank (ABA routing # or financial institution's assigned identifier number) to be modified.
2. Greenlist Administrator modifies bank profile elements.

B) Processing
1. Identify correct bank based on ABA routing #.
2. Display bank profile elements to be modified.
3. Perform validation on any elements that are changed.

C) Output
1. Post entry into the Authorized Greenlist Bank Master Data Base.
2. Post completion message on entry screen.
3. Print entry in New Bank Audit Maintenance log.

D) System Dependencies
1. Security System.

E) Data
1. Data validation sources
   a. Same as bank enrollment.
2. Data populated/maintained
   a. Authorized Greenlist Bank Master Data Base.

Deactivate a Bank Member Record within the Authorized Greenlist Bank Master

This process is related to the preferred Master Directory bank setup/maintenance process 200 depicted in FIG. 3.

A) Input
1. Greenlist Administrator enters action code (add/modify/delete) and Bank (ABA routing # or financial institution's assigned identifier number) to be deactivated.
2. Greenlist Administrator confirms deactivation request.

B) Processing
1. Identify correct bank based on ABA routing#.
2. Display bank profile elements to verify correct bank location to be deactivated.
3. Prompt user "Confirm this bank entry is to be deactivated."
4. Flag record to prevent future transactions from utilizing the bank being deactivated.

C) Output
1. Post status flag entry to the Authorized Greenlist Bank Master file.
2. Post completion message on entry screen.
3. Post entry activity in the Bank Master audit log.

D) System Dependencies
1. Security system.

E) Data
1. Data validation sources
   a. None.
2. Data populated/maintained
   a. Greenlist Bank master database.

Provide an Update Mechanism to the Greenlist Master Directory

This process is related to the preferred Master Directory enrollment/maintenance process 230 depicted in FIG. 4.

A) Input
1. Input screens for bank's customer service representatives for manual entry of member profile enrollment information for bank's customers, or for the bank's customers themselves to enter enrollment information through a bank's home banking portal 280. The customer populates the record with appropriate information which is then verified and released by the bank into their Greenlist remote directory.
2. Greenlist Bank Authentication process must verify the transaction header is an authorized member within the Authorized Greenlist Bank Master 240.
3. Greenlist Enrollment System must be built to have capability to accept fixed format file feeds for mass enrollments. System should populate the Master Directory account profile information with the member's transaction. All updates must be received via a valid Greenlist member bank.
   a. Input record must be fixed format.
   b. Input record will contain a status flag field of add; modify or delete.
4. Screens
   a. Input screen must provide for all account profile database data elements.
   b. Where possible, input screens must contain drop down boxes with valid values for specific data fields (e.g., state, flags for notification preferences, etc.).

B) Processing
1. Access to screen requires a security check to verify individual's id. and password for the bank's Greenlist system administrator has the appropriate security level to permit them to perform maintenance (add; modify; delete) on its customer's profile information.
2. Record status field identifies whether the transaction is an add; modify or deletion record.
3. Edits/Validations 225:
   a. Verify Greenlist number is a valid number from the Master Greenlist list assigned (licensed) to that financial institution.
   b. Verify the bank's routing number against the file of valid ABA route numbers 255.
   c. Verify the EPN LCA number is a valid UPIC from the EPN valid account # table 265.
   d. Perform verification checks on the structure of the addresses; e-mail addresses; city/state/zip combination 260.
   e. Delete transaction records will flag the master record with a delete flag and update the deletion date field with the system process date.
   f. Modify transaction record types will overlay the current Master Directory fields with the new transaction record updated fields.

C) Output
1. Updated Greenlist Master Directory 235.
2. Confirmation notification to the user display and to the Success/Failure Report file 275.

D) Dependencies
1. Process is a real time update process and has no dependency processes.

E) Data
1. Data Validation Sources
   a. ABA routing table 255.
   b. EPN UPIC account numbers 265.
   c. US Postal Service zip code file 260.
2. Data Populated/Maintained
   a. Authorized Greenlist Bank Master.
   b. ABA edit validation file.
   c. State code validation table.
   d. Zip code validation table.
   e. CHIPS and SWIFT validation files (if applicable).

Provide Nightly Update Feeds to/from Member Bank-Directory Sub Systems

This process is related to the preferred bank subsystem Greenlist update process 215 depicted in FIG. 5.

A) Input
1. None (nightly batch process).

B) Processing
1. Create a nightly (or real time) formatted replication from the Greenlist Master Directory 235 to the sub-set Member Remote Local Directories 295, 300, 305.
2. VPN will authenticate to check to ensure each bank entry in the bank Master file that is flagged for sub-directory update services is the correct ABA# as indicated in the Greenlist Bank Master file 240.
3. System will strip off and only forward new adds, modifies and deletes to the member bank sub-directory.
4. A maintenance input screen will be designed to enable VPN information to be updated within the bank subsystem update process.
5. An edit report of those transactions which failed will be generated.

C) Output
1. Bank specific transaction files of incremental changes to the Greenlist Master Directory file 270.

D) Dependencies
1. Updated Greenlist Master Directory.

E) Data
1. Data Validation Sources
   a. None.

2. Data Populated/Maintained
  a. Greenlist Master Directory database.
  b. Greenlist Master transaction files.

Provide Internet Search Capability of the Greenlist Master Directory

This process is related to the preferred Greenlist Internet inquiry process 220 depicted in FIG. 6.

A) Input
  1. Account holder name; bank name; bank location; ABA routing number; address, city, state; LCA number; telephone number; user ID and password.

B) Processing
  1. If entered, validate user ID and password. Determine security level.
  2. Edit check state entered against Zip/state table 260.
  3. Edit check ABA routing numbers against ABA Routing Table 250.
  4. Locate and display records matching any of the fields of information input.

C) Output
  1. Display name; address; bank routing number; LCA number for all records matching input values.

D) System Dependencies
  1. None.

E) Data
  1. Data Validation Sources
    a. Zip code File 260.
    b. ABA Routing # Table 255.
    c. Security Authorization File 245.

Assign a Valid LCA Account Range to a Licensed Member Bank in the Authorized Greenlist Bank Master This process is related to the preferred Master Directory LCA account assignment/validation process 340 depicted in FIG. 7.

A) Input
  1. Greenlist System Administrator provides user id. and password.
  2. Member bank identified.
  3. Valid Greenlist account block input.
  4. Bank ABA routing number.

B) Processing
  1. Check for required fields and format.
  2. Validate user id. and password against security database.
  3. Display administration homepage.
  4. Locate bank record via input ABA #.
  5. Flag a valid Greenlist range as assigned or released for reuse.
  6. Assign a "new-owner" member bank for the Greenlist range.
  7. Update the assignment period (from/to) onto the Greenlist Master file.
  8. Based on status flag either add or delete member bank's Greenlist range.
  9. Input display is updated with completion notification.

C) Output
  1. Post entry in audit activity log.

D) Dependencies
  1. Authorized Greenlist Bank Master file record for member bank being updated.
  2. LCA Master list database.

E) Data
  1. Data validation sources.
  2. Security database—verification that administrator Id. has rights to make updates.
  3. Greenlist range on Greenlist Master list Database is unassigned.
  4. Validate LCA account number syntax and check digit.
  5. Verify bank is a current bank member within Authorized Greenlist master Bank database.
  6. Data Populated/Maintained.
  7. LCA Master List File.

Preferred Master Directory Data, Edits, and Lookups

This section describes data, edits, and lookups related to the Master Directory. This includes:
  Preferred Financial Institutions Eligible To Operate Greenlist Directories;
  Bank/Financial Institution Enrollment Data Elements;
  Customer Enrollment/Profile Setup;
  Sub-System (Pay Transfer) Directory;
  Internet Lookup Of Greenlist Master Directory;
  Master Directory Account Lookup Validation;
  Greenlist Account Assignment; and
  Greenlist Master Directory Security/Maintenance Audit Log.

Preferred Financial Institutions Eligible To Operate Greenlist Directories:

A. Clearinghouse Institutions
  NACHA, Federal Reserve Bank of Cleveland (a.k.a. ACH) or an equivalent clearinghouse institution such as the Electronic Payments Network (EPN), and industry specific clearinghouse institutions such as Affiliated Network Services (through a sponsor bank).

B. Bank Institution
  Any bank registered with the American Bankers Association and certified by the respective State Licensing Authority to conduct business in the United States.

C. Non-Bank Financial Institution (NBFI)
  Limited to NBFIs that also own or are owned by banks: e.g., Metavante.
  Limited to NBFIs that are recognized as proxy institutions for banks: e.g., Zenith Information Systems' alliance partner relationships with banks.

Bank/Financial Institution Enrollment Data Elements

Bank profile data elements for each bank record preferably include the following: elements:
  Bank (branch) name*
  Bank address*
  Bank main phone number*
  Bank status*
  Password*
  ABA 9-digit routing/transit number*
  Greenlist Master/Directory account number*
  Bank parent entity Master Directory account number
  Bank Master Directory primary and alternate administrator contact name(s)*
  Bank Master Directory administrator contact address*
  Bank Master Directory administrator contact phone number*
  Bank Master Directory administrator e-mail address (if applicable)
  Bank administrator security authorization level*
  Bank Greenlist issued account number range
  Bank ACH customer support number
  Bank CHIPS number (if applicable)
  Bank CHAPS number (if applicable)
  Bank IBAN number (if applicable)
  Bank Federal Electronic Transfer Agent number (if applicable)
  Bank SWIFT number (if applicable)
  Bank EPN UPIC account number (if applicable)
  Requested preferred notification/acknowledgment means of communications method*
  Create user id (sys generated)
  Update user id (sys generated)
  Creation system date (sys generated)
  Creation system time stamp (sys generated)
  Update sysdate and time (sys generated)
  Comments section

*Required fields (must have content (non-special character))

Edits to be performed by Greenlist on Greenlist Master Bank profile record input:

Validate Master Directory account number (check sum digit).

Validate ABA routing number against a valid ABA routing directory.

Edit check comparison of phone number prefix to zip code for correct geographic location match.

There must be a minimum of one bank administrator contact entered.

Security authorization level requested must be valid and less than the Payment Pathway's data system administrator's authorization level.

If available, validate the IBAN; UPIC; CHAPS; CHIPS; SWIFT; ACH numbers against published directories.

Note—the EPN UPIC account number may be used in lieu of the Greenlist LCA number.

issues an electronic acknowledgment notification back to the bank (either via e-mail or fax, as indicated by the bank's Requested Notification/Acknowledgment Means of Communication" field). The acknowledgment to the bank is a confirmation that the initialization of the bank-provided record was successful. The acknowledgement message may be similar to the following:

"(BANK NAME) has been successfully initialized on the Greenlist Master Bank file as of (DATE AND TIME). The Greenlist Master Bank account number for (BANK NAME) is (BANK GREENLIST IDENTIFIER NUMBER). Authorized Master Directory administrators are (XYZ Administrators). All account administrative communications will be made to (list the e-mail or fax number). If you have any questions please contact (Greenlist Data Systems Administrator) at (phone number). New Individual/Business entities

TABLE 1

BANK DATABASE

| | | | | |
|---|---|---|---|---|
| Bank LCA identifier | AN | 17 | Y | LCA record identifier for bank (or branch) |
| Bank LCA Status | N | 2 | Y | Value: "01" active; "02" pending; "03" inactive; "04" on hold |
| Bank Fed routing number | N | 9 | N | Fed Reserve bank routing/transit number of BBK |
| Bank name | ANS | 35 | N | |
| Bank address line 1 | ANS | 35 | N | |
| Bank address line 2 | ANS | 35 | N | |
| Bank address line 3 | ANS | 35 | N | |
| Bank address line 4 | ANS | 35 | N | |
| City | AN | 32 | N | |
| State/Prov | AN | 32 | N | |
| Postal code | AN | 11 | N | |
| Country | AN | 2 | N | Values defined by ISO-3166 2-letter code |
| Bank's Internet address | AN | 50 | N | |
| Master/parent LCA account number | AN | 17 | N | Bank's corporate master LCA identifier |
| Bank primary Administrator id. | N | 10 | N | Administrator of bank's PayTransfer system |
| Bank primary Administrator security level | N | 2 | N | |
| Administrator e-mail address | AN | 50 | N | |
| Bank alternate Administrator id. | N | 10 | N | Backup Administrator of bank's PayTransfer system |
| Bank alternate Administrator security level | N | 2 | N | |
| Alternate Administrator e-mail address | AN | 50 | N | |
| Technical contact name at bank | AN | 80 | N | |
| Technical contact phone# | N | 11 | N | Right justified for non-international |
| Technical alternate contact name at bank | AN | 80 | N | |
| Technical alternate contact phone# | N | 11 | N | Right justified for non-international |
| Technical contact e-mail address | AN | 50 | N | |
| Bank notification preference code | AN | 1 | N | Notification preference (e-mail; fax; telephone) |
| Bank notification information | AN | 26 | N | E-mail address; notification or fax phone number |
| EPN capable | N | 1 | Y | Valid values: "0" not enabled; "1" yes enabled |
| CHIPS capable | N | 1 | Y | Valid values: "0" not enabled; "1" yes enabled |
| CHIPS participant number | N | | Y | |
| Bank SWIFT/BIC | AN | 11 | | BIC code of bank |
| Wire pay N/A 1 | AN | 35 | Y | CHIPS/Fedwire payment name/address 1 |
| Wire pay N/A 2 | AN | 35 | Y | CHIPS/Fedwire payment name/address 2 |
| Wire pay N/A 3 | AN | 35 | Y | CHIPS/Fedwire payment name/address 3 |
| Wire pay N/A 4 | AN | 35 | Y | CHIPS/Fedwire payment name/address 4 |

As part of the preferred input audit process, after the bank's profile record is successfully initialized, the Greenlist system Master Directory accounts can now be added to your Greenlist system."

TABLE 2

MASTER DIRECTORY ACCOUNT HOLDER/ENTITY PROFILE

| | | | | |
|---|---|---|---|---|
| LCA identifier | AN | 17 | Y | Linked Credit Account debit blocked unique identifier for individual or entity |
| LCA Status | N | 2 | Y | Value: "01" active; "02" pending; "03" inactive; "04" on hold |
| UPIC identifier | AN | 17 | Y | EPN Universal Payment Identification Code |

TABLE 2-continued

MASTER DIRECTORY
ACCOUNT HOLDER/ENTITY
PROFILE

| Field | Type | Size | Req | Description |
|---|---|---|---|---|
| UPIC status | N | 2 | Y | Value: "01" active/open; "02" pending; "03" closed |
| LCA effective date | D | 8 | N | Effective date when LCA made active (YYYYMMDD) |
| UPIC effective date | D | 8 | N | Effective date when UPIC made active (YYYYMMDD) |
| Master/parent LCA account number | AN | 17 | N | Corporate parent consolidation rollup account number (if applicable) |
| Bank R/T # | N | 9 | Y | Fed Reserve Bank routing/transit # for customer's bank |
| Account holder DDA account# | AN | 34 | N Y | DDA # (if EPN capable, max size is 17). Values left-justified/zero fill |
| Taxpayor ID# or FTIN# | AN | 12 | N Y | Federal Tax Identification Number |
| Account holder name | AN | 80 | Y | Account holder individual or entity Name |
| Entity division name | AN | 80 | Y | Business division name (if applicable) |
| Entity short name | AN | 16 | N | Shortened name of account holder |
| Address1 | AN | 64 | Y | First address line |
| Address line 2 | AN | 64 | Y | Second address line of address |
| Address line 3 | AN | 64 | Y | Third address line |
| Address line 4 | AN | 64 | Y | Fourth address line |
| City | AN | 32 | Y | |
| State/Prov | AN | 32 | Y | |
| Postal code | AN | 11 | Y | |
| Country | AN | 2 | Y | Values defined by ISO-3166 2-letter code |
| Account holder/business entity phone number | N | 11 | N | Right justified for non-international |
| Account holder mobile phone number | N | 11 | N Y | Right justified for non-international |
| Account holder fax phone number | N | 11 | N Y | Right justified for non-international |
| Technical contact name at entity | AN | 80 | N Y | |
| Technical contact phone# | N | 11 | N Y | |
| Technical alternate contact name at entity | AN | 80 | N Y | |
| Technical alternate contact phone# | N | 11 | N Y | |
| Account holder e-mail address | AN | 50 | N Y | |
| Account holder notification preference code | AN | 1 | N Y | Notification preference ("00" none; "1" e-mail; "2" fax; "3" telephone) |
| Account holder notification information | AN | 26 | N Y | E-mail address; notification or fax phone number |
| Accounting software package | N | 2 | N Y | A/P and A/R software package of account holder |
| Accounting software update flag | N | 1 | N Y | "0" no; "1" yes |
| SIC Business code | N | 4 | Y | Standard industrial classification code |
| DUNS Id | N | 10 | Y | D&B D-U-N-S number |
| Thomas Register# | N | 10 | Y | Thomas Global Registry company identifier |
| Payment network preference of biller | N | 1 | Y | "1" ACH; "2" SWIFT; "3" Fedwire; "4" CHIPS; "5" other |
| BIC code | AN | 11 | N | SWIFT BIC code |
| BEI code | AN | 11 | N | SWIFT business entity identifier |
| IBAN code | N | 34 | N | International bank account number |

Customer Enrollment/Profile Setup:

The actual process of establishing a new LCA account begins at the payee's bank. The bank may send out marketing forms announcing this new Greenlist product to their entire existing base of customers or include the option for new accounts. The Greenlist account holder can request listing on the Internet accessible Greenlist Master Directory. The setup can also be initiated by the bank's extended customer service function (e.g., healthcare clinic/dentists registration desk; school administration office; trade association/union; company payroll or shareholder relations department; company accounts receivable department, insurance carriers; credit card company, etc.). The system preferably accommodates potential mass batch input of member accounts from these types of organizations or entities on behalf of a member bank. In each of these "representative" initiated requests, however, there is still the requirement that each Individual/Business entity's affiliated bank or financial institution must have a pre-established Bank Profile account number established on the Greenlist Master Directory, the FED-ACH or the Electronic Payment Network's UPIC Directory.

The enrollment system preferably is a browser-based registration system. The entry point preferably is one of the following: (1) a customer user interface via a link off the bank's on-line home banking portal site; (2) a kiosk banking station within the bank; or (3) via an on-site terminal (workstation) at a bank customer service desk. In the case of the latter, the individual or business entity customer would either be talking or providing information to the customer service representative in person or via telephone.

In order for a "member" (biller/payee) of that bank to reside on the Greenlist Master Directory, a business entity or individual must first have established an LCA and a DDA (Demand Deposit Account) at the Greenlist subscribing Greenlist affiliated bank or an authorized partner organization bank (e.g., EPN).

In order to access the Greenlist system registration screens, bank personnel or the bank customer member must supply their bank DDA and password. The DDA number and password is the front-end security mechanism for the account holder's portion of the Greenlist system. The DDA number is validated against the bank's active account database. The banking password is critical to prevent an intruder knowing a business entity or individual's bank demand deposit account number from creating a "redirecting LCA number" to his or her own LCA account. The Greenlist validation process would have trapped and flagged any "redirections" as the normal process would be a "remove and replace" by the system.

Through the bank's on-line bank portal system, the business or individual "member" will make a request to their bank for a mobile payment capability (preferably utilizing a debit-filtered account variation of the LCA (i.e., linked credit account (LCA or UPIC for EPN Network bank). The LCA is linked to the DDA account. A secure hot-link from the home banking-portal to the bank's local Greenlist payment system guides the member's enrollment.

New LCA member information requires name/address information, fields such as method of notification (e.g., fax, e-mail, telephone), and provisions for future use of other IDs (e.g., UPIC; SS#; IBAN#; FEIN#; DUNS#; industry).

Note—the communication aspect of the system preferably allows for decentralized multi-branch banking systems to communicate all branch submissions to their centralized parent site for consolidation and nightly re-transmission to the Master Directory System. That parent bank may elect to push back to its entire branch Greenlist system locations all records relating to all of the banking systems member branch banks so each branch would have a Sub-Master Directory listing of all account holders for that entire banking system's member base.

The Greenlist Master Directory System performs edits and validation checking. Some of the edits include a verification of the bank's ABA number, LCA, UPIC, and IBAN.

After the new bank customer's LCA account is set up on the Master Directory, the new account member is sent a message from their bank similar to the following:

"(BANK NAME) is pleased to inform you your new (BANK NAME) LCA account and Master Directory Greenlist accounts have been initialized on (system date) and is now operational to receive funds." Your LCA account number is (LCA Individual/Business entity account number). It is suggested business entities include the LCA number on the remittance portion of your invoices with instructions to your payors to use this secure electronic account number in lieu of paper checks for making payments. As a reminder, please note the LCA account can only be used to receive funds. Any debit originations will be blocked. No withdrawal of funds can be made directly from this secure account. Monies received into the LCA account will be swept into your demand deposit account(s) on a regular basis according to the schedule established with (bank name)."

The system will also create and send a notification audit report to the bank advising of the successful or unsuccessful processing of the previous night's customer directory account maintenance.

The member enrollment process is complete at this stage. The "member's" record containing their new LCA (or UPIC) account number on the Greenlist Master Directory is at this point searchable via the Internet. The new Greenlist/LCA Account is active and ready to begin receiving payments.

Another embodiment provides for a mass batch sign-up of individual consumers from an organization (e.g., union, University, clearinghouse members, and groups such as AARP, etc.) under an unassigned-"pending-bank"-assignment/bank-activation category. The organization of individual members is "shopped out" to a banking entity that is already a member or up-coming new member of the Greenlist Directory or EPN networks.

The profile data elements to be captured for each Individual/Business entity include:
Individual/Business Entity LCA Profile Record
Individuals Greenlist account #
Bank's 9 Digit ABA routing/transit number*
Individual/Business entity LCA (National Billers Directory) number
Individual/Business entity's bank demand deposit account (DDA) number
Individual/business entity name*
Individual/Business entity complete address*
Individual/Business entity phone number*
Individual/Business entity cell phone number (if applicable)
International destination flag*
Loyalty points field 1 or 10
Individual/Business entity fax number (if applicable)
Individual/Business entity e-mail number (if applicable)
Business entity Federal Tax Id# (if applicable)
Business entity DUNS# (if applicable)
Business entity industry
Business entity LCA contact name
Business entity LCA contact telephone
Individual/Business entity UPIC number (if applicable)
Individual social security# (potentially needed for insurance and healthcare providers)
Individual/Business entity consolidation parent LCA number (if applicable)
Individual/Business entity preferred communication method of billing notification/acknowledgment*
(Depending on method chosen, data to facilitate that becomes a required field)
Individual/Business entity preferred communication method of funds receipt notification/acknowledgment*
(Depending on method chosen, data to facilitate that becomes a required field)
Individual/Business entity status (new/existing/terminated/pending/hold**)
Account system date of creation
Account time stamp date of creation
Bank personnel Greenlist Directory system ID Number
Extended comments field
* Required fields must have content (non-special character).

Edits to be performed by the bank's local Greenlist system include:
Validate field lengths for data entered.
Validate LCA number (check digit sum).
Validation of the UPIC numbers from an EPN UPIC verification file.
Valid assigned Greenlist range for bank entity for NEW Individual LCA registrations.
Range zip code phone prefix compare for valid geographic area.
Note—a bank assigned "Hold" status for an Individual would have funds blocked from being swept.
Note—whenever possible the data input fields preferably are pre-populated with existing bank information stored in the Greenlist (e.g., bank LCA number and ABA number) system or the banks own member account systems.
Note—The bank's stored routing number in the Greenlist System and the LCA (next available sequential within the bank's block of numbers) will be system generated by the Greenlist system.
The system preferably tracks any change to an individual or business organization's bank affiliation. The combination of an individual/business Greenlist account and the affiliated bank's routing number provides for the unique record identifier for financial transactions and acknowledgments within the Greenlist system.

When an individual closes their demand account at a financial institution, it is the responsibility of that Greenlist member, as part of their termination process, to submit a standard Individual/Business entity LCA change of status (inactive) transaction. The Greenlist Master Directory will receive update transactions to reflect the change in status from "active" to "in-active" for the LCA account number. Procedurally, whenever an LCA customer changes their profile demographic information on their demand account, the bank will at the same time submit update maintenance to their local Greenlist system. This information preferably flows through and updates the Greenlist Master Directory records during nightly batch update processing. The LCA customer may be notified of the time necessary for the change to take effect (propagate across the entire system).

Bank Sub-System (Pay Transfer) Directory

Individual Bank Directories must be registered in order to be certified and maintained by Greenlist. Following this procedure will ensure a core infrastructure that financial institutions and enterprises can rely on to eliminate fraud and cost associated with paper and other single-factor payment methods such as off-line debit and credit cards.

The local Greenlist System's look and feel may be "private-label" branded according to the look and feel standards the bank already employs for their own home-banking portal(s). The individual bank may be responsible for any coding necessary to incorporate the Greenlist Master Directory into the bank's current home banking portal.

After agreements are signed, Greenlist may physically install a standalone Greenlist hardware/software system within the bank's firewalled environment. The necessary VPN communications links to the Master Directory System may be established and security directory management technology may be deployed and activated.

Assisted by the Greenlist "Directory Administrator" or authorized banking personnel, the bank's authorized "Greenlist Administrator" would register the bank by completing the bank profile registration screen on their newly installed Greenlist system.

Completion of this process generates a "pending bank profile" record and an update transaction file that is transmitted via secure VPN connection to the Greenlist Master Directory System. The bank's information is validated/verified (e.g., validated against Fed bank routing #; valid Greenlist authorized bank account#; valid UPIC number, etc.) by the Master Directory System.

A successful validation will result in a "confirmation transaction record" being generated by the Greenlist Master Directory and transmitted back to the bank's Greenlist system to initialize the system and change the bank's system status field from a "pending" to an "active" status.

Internet Lookup of Greenlist Master Directory

Operationally, in order to use Greenlist for payment and settlement processing, an individual or entity (seller) wishing to bill a buyer (payor) preferably requests the buyer to deposit funds into a biller's LCA account. The buyer can locate the seller's account number by doing an Internet search on the Greenlist Master Directory.

In order to facilitate the use of the Greenlist, billers or those who are to receive claim settlement (i.e., insurance) checks or stipend checks from government or other sources will be requested through the biller's (payee) bank and Greenlist marketing literature to notify those payor entities to route payments via the Greenlist Mobile Payment Network, ATM Networks, Electronic Payment Network, or Federal ACH Network. They will be requested to provide their bank routing and LCA or UPIC account number to the payor.

All Individual/Business entity LCA and UPIC account numbers are open for public query/search. (Special security logic may be used help to require registration of the viewer in order to access demand deposit account numbers should the business requirements of the system permit inclusion of actual bank account numbers within the Directory as record keys. Access to the banking profile record information within the Greenlist Master Directory is also open for unrestricted public viewing The Greenlist Master Directory site is accessible via Internet link or through any public Internet search engine (e.g., Google).

Master Directory Account Lookup Validation

The Master Directory's successive levels of search criteria for biller account record lookup preferably include:

Name (Individual or Business Entity)

Type of entity drop down (e.g., government, telephone companies, gas and electric utilities)

State or geographic region drop down

Address (partial and full)

Telephone number

Bank name (and/or routing number)

Bank Branch location

The search will either reveal the biller LCA, UPIC number and bank routing information or return a message indicating an account number was not found or is unavailable. If the "not found" condition occurs, the system will also display information explaining how one can go about joining the Greenlist system.

Note—an individual or business may have multiple account numbers if they perform financial transactions at multiple banks.

It is preferable that a participating origin bank for the consumer establish a relationship with an authorized Greenlist financial institution (or EPN bank) or influence their existing bank to join the Greenlist system. That financial institution will be registered and have operational within its physical environment a Greenlist system. The enrollment system functionality built within the Greenlist system maintains a local directory and profile of all participating business entities and consumers that have enabled LCA accounts at the bank. The enrollment function of the Greenlist System maintains the replication of information between itself and the Master Directory. The Master Directory provides its members a national and international visibility via the Internet.

Greenlist Account Assignment

As indicated earlier, in one embodiment, as part of the contractual arrangement with the Greenlist Directory Services organization, each bank "rents for use" its block of registered Greenlist account numbers. As long as the owner of the LCA account is assigned to the bank that subscribes to the LCA service, the bank pays Greenlist a monthly fee for all registered (active and inactive) reserved LCA authorized accounts it "controls". The Greenlist Directory System may require a process and system for monitoring and tracking these Greenlist assets. The account numbers are registered to the lessee bank for the period during which the bank's member has a demand deposit account at the bank. The tracking system will record the start and end dates for the period during which the account numbers were registered to that bank.

Greenlist Master Directory Security/Maintenance Audit Log

The Master Directory update/maintenance process logic provides an audit trail of any changes made to the Master Directory:

Record for any add, modify and deletion of data within the Bank Profile Table.

Password-based security in order for the bank's authorized systems administrator to log on to the Greenlist Master Directory to perform Directory maintenance for their bank.

Security mechanism for the Greenlist Master Directory will be designed to provide for four security authorization levels:

A. Level 3—Authority to view only (for bank staff; business entities and individual consumers; Greenlist non-system administrator personnel).
B. Level 2—Authority to change indicative bank data.
C. Level 1—Authority to add/delete a record.
D. Level 0—Greenlist Systems Data Administrator.

Audit trail with date and time stamp including the ID of the individual making changes.

A record of any change made to the Directory's Bank Profile Table will be record in the PP Master and the Master Maintenance Audit Log tables.

Maintenance Audit Log Table Content:
Bank Master number
Green list Individual's id.
Bank systems administrator id.
System time stamp
Transaction (add/delete) status change from
Transaction (add/delete) status change to
Transaction (change) field name
Transaction (change) field from
Transaction (change) field to Key to Figures:

FIG. 1

| | |
|---|---|
| 100 | Greenlist |
| 105 | (points to Greenlist databases) |
| 110 | Bank |
| 115 | (points to Bank databases) |
| 120 | Subscriber |
| 130 | DNS |
| 140 | Transaction Processing |
| 150 | Initiator |

FIG. 2

| | |
|---|---|
| 200 | New Member Bank Setup Process |
| 205 | Licensee Number Assignment Process |
| 210 | GL Security Authentication Process |
| 215 | Nightly Member . . . Update Process |
| 220 | "Google" Search Process |
| 225 | Input validation Edits |
| 230 | Master Directory Update Process |
| 235 | GL Master Directory |
| 240 | Authorized GL Bank Master |
| 245 | Security Authorization File |
| 250 | Licensee Master File |
| 255 | ABA Banking Validation |
| 260 | ZIP/State Table |
| 265 | UPIC Master |
| 270 | Audit Log |
| 275 | Confirmation Reports |
| 280 | New Enrollment Input From Member Banks |
| 285 | Bank Enrollment by GL Sys Admin |
| 290 | Directory Internet Search Inquiry |
| 295 | Member Bank 1 Remote . . . |
| 300 | Member Bank 2 Remote . . . |
| 305 | Member Bank 3 Remote . . . |

FIG. 3

| | |
|---|---|
| 200 | New Member Bank Setup Process |
| 205 | Licensee Number Assignment Process |
| 225 | Bank Input validation Edits |
| 240 | Authorized GL Bank Master File |
| 245 | Security Authorization File |
| 250 | Licensee Master List File |
| 255 | ABA Banking Validation |
| 260 | New Bank Enrollment Input . . . |
| 260 | ZIP/State Table |
| 270 | New Bank Audit Maintenance Log |
| 310 | Contractual . . . |

FIG. 4

| | |
|---|---|
| 210 | GL Bank Authentication/Authorization Process |
| 225 | Input Validation Edits |
| 230 | Master Directory Update Process |
| 235 | Current GL Master Directory |
| 235 | Updated GL Master Directory |
| 240 | Authorized GL Bank Master |
| 250 | Licensee Master File |
| 255 | ABA Routing # |
| 260 | Zip/State Table |
| 265 | UPIC Master |
| 275 | Confirmation Success/Failure Reports |
| 280 | New Enrollment Input Requests . . . |
| 280 | New Mass Enrollment Input Requests . . . |
| 315 | File sort |

FIG. 5

| | |
|---|---|
| 215 | Nightly Member Bank(s) . . . Update Process |
| 235 | GL Master Directory |
| 240 | Authorized GL Bank Master File |
| 270 | Audit Log |
| 295 | Member Bank 1 Remote . . . |
| 300 | Member Bank 2 Remote . . . |
| 305 | Member Bank 3 Remote . . . |
| 320 | Communicate/Update Bank sub-Systems |

FIG. 6

| | |
|---|---|
| 290 | Directory Internet Search Inquiry |
| 235 | GL Master Directory |
| 245 | Security Authorization File |
| 220 | "Google" Directory Search Process |
| 260 | ZIP/State Table |
| 240 | Authorized GL Bank Master File |
| 255 | ABA Bank Routing Table |

FIG. 7

| | |
|---|---|
| 210 | GL Security Authentication Process |
| 225 | New Enrollments Input Validation Edits |
| 230 | Master Directory Update Process |
| 235 | GL Directory Master List File |
| 240 | Authorized GL Bank Master |
| 245 | Security Authorization File |
| 265 | UPIC Master |
| 325 | LCA Block Assignments . . . |
| 330 | EPN Update File |
| 335 | Licensee File Update Process |
| 340 | Licensee Validation Process |

Healthcare Embodiment

Healthcare clearinghouses are now addressing the emerging needs for Electronic Remittance Advisory (ERA) payments (i.e., HIPAA-compliant medical payments). ERAs are mandated for Medicaid and Medicare, and many insurance carriers are implementing ERAs for all payments. These payment communities all require the ability to settle payments without today's security risks and payment delays. Here is how one embodiment of the invention works for healthcare:

The use of a Greenlist, as discussed above, eliminates the potential risk of overdraft associated with DebitACHS by issuing CreditACHs. In addition to the above-mentioned efficiencies associated with authentication services provided by parties in the position to do so with the least cost (e.g., banks), in the healthcare context that use is augmented by two, more subtle, uses.

First, reversal of the way that recurring billers are paid, putting control of payment release into the hands of the consumer or small business.

Second, when a small or even medium sized business is a health care provider and the party billed is an insurance carrier; up to now these entities have been reluctant to provide their bank account information to the carriers for fear that payments for charges that are later determined to NOT be covered by an insurance policy could be debited or "clawed back" immediately, instead of being reconciled in the next month's payment cycle.

Banks functioning as Greenlist registrars preferably enroll small businesses (such as health care providers) in the Greenlist and assess service fees. A portion of this monthly fee is net income, and a portion of the fee is used as net income for registrars to list debit blocked (or debit filtered) payment addresses in the public Greenlist. In Healthcare, the potential exists for a Clearinghouse and/or any federation banks serving Insurance Carriers to institute a company that functions as a proxy registrar (for banks) and perform Greenlist enrollment functions by obtaining a system use license.

The Greenlist performs numerous services that are in demand today among Insurance Carriers. The Greenlist:

(a) Allows private access to a complete Greenlist data field. For instance, social security numbers could be exposed to licensed participants among the carriers and their banks. This is useful to resolve Unique Identifiers pertaining to consumer identities into safe "where to pay" payment addresses (payments via CreditACH). Also, Clearinghouse identifiers may be obtained for PHI delivery (e.g. NPI, TaxID, TSO, etc.)

(b) Accepts HIPAA X12 835/ERA mass enrollment transaction files from corporations (consumers who have opted in to be given safe and Greenlisted payment addresses so their insurance co-pay reimbursements can be electronically deposited).

(c) Allows for the clearinghouse to act as a Claim/EFT clearinghouse for payors. Thus, as more and more payors begin to perform real time adjudication, the same clearinghouse that is processing the claims can also return the Greenlist-routed status responses with payment information and/or payment confirmation information, even for payors that have not yet begun to offer 835s/ERAs. The payors (insurance carriers) can contract for all their needs with the clearinghouse without having separate bank relationships for electronic payments to providers.

(d) Allows for mass Greenlist enrollment at the time of ERA enrollment, particularly in the early phases when providers are not being enrolled, for the most part, one by one, but are being "mass enrolled."

For every provider enrolled by a clearinghouse, a number of "placeholder" Greenlist enrollment "slots" will be allocated by default, whether or not the provider has elected to use the Greenlist yet. Then if the healthcare provider decides to use the Greenlist, they merely indicate this to their Practice Management System (PMS) vendor or the clearinghouse and the PMS or clearinghouse simply flips the switch for that provider to trigger the registration process for creation and assignment of debit blocked bank accounts being created by the bank(s) registrars that are affiliated with the Clearinghouse.

The Greenlist Directory provider performs numerous services that are in demand today among Health Care Providers of any size. The benefits are equally the same for clinics, large provider groups and possibly small hospitals that do not already have a system in place. The benefits include:

no chance of payment reversals since payment addresses are debit-blocked (debit filtered);

notification by Greenlist switch (optional) when payments arrive via method of customer's choosing. (email, voicemail, SMS);

a PrivatePhone number (e.g., from NetZero) for voicemail so provider's business lines are not called with payment delivery notifications;

avoids the worry by the provider that the carrier is not working directly with "their" bank since the system is bank neutral from the provider perspective;

HIPAA compliant payment method;

the same system (Greenlist) can be used to receive payments regardless of how many insurance carriers the provider works with (benefit of the clearinghouse being the intermediary); and can easily accommodate provider offices where each physician or dentist wants to be a separate "pay to."

Currently, many provider offices that wish to have payments go to specific TaxIDs must allow the payments to go to one TaxID and perform reconciliation at a later time because the payor cannot accommodate multiple payments to a single TaxID.

In one embodiment, the Greenlist allows the clearinghouse to use the ERA/rendering provider to determine the payee and then distribute the payments to specific TaxIDs while also indicating this on the ERA so that the provider office/providers themselves can see the breakdown by line item and to whom the payment was distributed. Features of this embodiment include:

The Greenlist storing the history of payments to allow the provider a second avenue for reconciling payor to provider payments distinct and separate from overall receivables.

Periodic "keep alive" testing of payee addresses. Bank registrars warrant that payments coming IN to payees that are registered will be incapable of being clawed back because the Greenlisted e-lockbox account is a filtered DDA.

There are forces moving toward Greenlist usage among healthcare clearinghouses and insurance companies migration to ERA payments. Already, ERA payments to ACH payment addresses are mandated by Medicaid/Medicare As of Oct. 1, 2006, Medicaid will no longer allow the use of paper remittance for any provider that has elected or decides to elect to received ERAs (electronic versions of the explanation of benefits). An inherent part of the ERA is the inclusion of payment information and ultimately, the coordination of payments. The ERA's value is diminished anytime it is delivered without payment information. Thus, CMS, the ADA and the AMA and the state societies (as well as industry organizations) are all pushing, primarily the clearinghouses, to derive a method whereby the provider and payor "can do what they do today" and the clearinghouse take on also being an EFT/ACH clearinghouse coordinating payments with the claim (it is most logical at this point in the claim processing process).

The bottom line is that the ERA, which will eventually be mandated (not allowing providers to elect, but telling providers that they can only be a part of the carrier network if they are willing to receive ERAs over paper), cannot be effective, without the coordination of payment information. Medicaid is leading the charge and carriers will follow suit as the check printing and Explanation of Benefits (EoB) printing processes are inherently far more expensive than their electronic counterparts. Carriers now are addressing the objectives of lowering operational overhead for mail room, customer support, imaging and printing systems, etc. This was not true in previous years because new process implementations mandated by HIPAA overwhelmed the industry. In 2006, many payors are already offering incentives to providers who are willing to give up paper remittance for ERAs. This shift in priorities that are now being addressed by providers of all size, has tidal force. The Greenlist solves an important problem that is a barrier to full and speedy implementation of HIPAA 835/ERA payments: provider reluctance to supply a bank account number.

Social Networking Embodiments

The next step in the evolution of social networks will be payment transactions between two parties. Complementing each social network's directory of individuals will be a directory of payment addresses, the Greenlist, which identifies and validates each individual or commercial entity as real. This will allow consumers and businesses to electronically make payments or authorize account access through the social network.

Banks will view social networking as an ideal market to drive demand among a huge cadre of financially viable, young consumers. Social networks are ideally positioned, therefore, to be Greenlist distribution channels.

Today, two-thirds of U.S. youths have profiles on multiple networks—and 53 percent would join another if it were compelling enough. With potentially millions of U.S. consumers willingly Greenlisted, the motivation for leading banks to facilitate the enrollment process is higher. Similarly, merchants will be motivated to list themselves because of the spending power of this segment. Finally, the Greenlist allows banks to market to an emerging generation of customers that the banks have failed to connect with thus far. "Meet them where they are" is the right approach and this demographic group lives online and wants new payment services.

Today, banks spend an average of $284/customer for marketing expenses devoted exclusively to acquiring new customers. This market pull strategy may be used to bring those young customers, in their millions, to the banks at a hugely reduced marketing cost. Such web portals offer the largest and fastest opportunity to trigger rapid adoption.

However, social networking has taught the practice of masking one's true identity behind false names, false personas, etc. The transfer of information assets does not always flow downward from a repository to a consumer of information. For example, consumers, highly practiced in the art of bearing false witness with regard to their true identity can and do post false information on Wikipedia. Already this has resulted in discovery and permanent blocking of congressional staffers from making edits, posts, or removal of information pertaining to U.S. lawmakers. Greenlist, in one embodiment, will perform the role of switching an authentication request (that a person is who he says he is) to the least cost, most trusted arbiter of identity authentication: the bank. In our view, the banks will perform authentication for a small fee that will assign premium value to posts in repositories such as Wikipedia. In fact, a user, wishing to remain anonymous but identifiable after a fee is paid, can and will make posts in the future to free and paid repository information services alike.

Finally, the implication for proving membership exists in paid subscription services when the user is moving from location to location and seeking access to film and music downloads to entertain friends is the culmination of the role Greenlist plays as the penultimate application layer switch.

Embodiments for Communities of Interest

In other embodiments, the invention may be used for communities of interest for which identifiers, authentication, and transactions are relevant. Examples of such communities of interest include digital rights management, air travel or ticket reservations or confirmations, and shippers and receivers of merchandise. A community of interest may operate with information held in either a public or a private set of databases. For each such community of interest, an embodiment comprises elements including the following, with labels as in FIG. 1:

An individual, user, consumer, company, or other identifiable entity that can be a Greenlist subscriber 120.

An organization, company, or other entity that can be Greenlist licensee 110. The licensee acts as registrar, hosts the relevant remote portion of Greenlist data 115, and handles authorization and possibly notification functions.

An identifier that applies to each subscriber. The identifier is determined by the community of interest. The identifier may be associated with the subscriber in general, or the identifier may be generated for specific instances of use (e.g., incorporating a confirmation number for a purchased good or service).

A transaction processor 140 that uses the Greenlist licensee for authentication and authorization based on the subscriber's identifier. The transaction processor is, or is acting on the behalf of, a risk bearer that is responsible for providing the assets to the particular community of interest.

A public or private database 130 for lookups, including a public or private ENUM lookup that maps a subscriber's phone number to the subscriber's identifier, as appropriate for the particular community of interest.

In the payments embodiments described above, a bank acts as a Greenlist licensee, and a subscriber's identifier may be a Linked Credit Account (LCA). The transactions are payment transfers.

In a healthcare embodiment described above, a bank also acts as a Greenlist licensee. The transactions may involve payment transfers and/or routine or emergency access to medical records and notifications are made to transaction participants in the manner specified by the participants themselves during the time of registration. Notification preferences may be revised or enhanced by conditional assignments of parties to be notified, in what manner, etc. An example of this would be for first responders, having rights to access medical information via Greenlist's public identifiers without the delay of additional authentication and authorization that the owner of the information assets being accessed normally requires. The owner could be unconscious, for instance. Notification that medical information has been accessed by a first responder might be sent to the owner of the information, his health care provider (such as his primary physician), and his immediate family member.

For a digital rights community of interest, a subscriber would be assigned a subscription identifier. A Greenlist licensee (e.g., a bank or other company so licensed to be a Greenlist Registrar) would authenticate users to a risk-bearer that manages the digital asset. For example, an individual with a media subscription may want to download or play a video or piece of music. A media company would authenticate the individual via the licensee. This example is analogous to a payments transaction: for payments, the asset is financial; for this example, the asset is digital.

For a tickets-based community of interest, examples include a user accessing and printing hotel or event ticket reservations or confirmations, or a passenger printing out an airline boarding pass. The identifier may incorporate a confirmation number for the purchased ticket or room reservation. In these examples, the risk-bearer is responsible for the information-based asset (the ticket, confirmation, or boarding pass). The risk-bearer wants to authenticate a user who requests access, such as for printing. Again, this is analogous with the use of the invention in a payments embodiment.

For shipping and receiving communities, the risk-bearer is responsible for a physical asset. In one example, a shipper will not ship or deliver goods until a user has been authenticated as a legitimate receiver of the goods. In another example, a merchant will not release goods for shipment until receipt of payment has been confirmed. The identifier would be appropriate to the particular transaction and/or transfer of a physical asset.

This embodiment relates to the following patents related to dissemination of product information from manufacturers: U.S. Pat. Nos. 5,913,210; 6,154,738; 6,418,441; 7,117,227. See also U.S. Pat. App. Pub. No. 2006/0011720.

U.S. Pat. No. 6,418,441 discloses and claims the "Web Register." A block diagram (FIG. 6 in the patent) illustrates how a retailer's inventory control system sends UPC codes and on-hand quantities to a shared server which performs sales transactions for the retailers. The patent proposes that payments be made using standard credit card methods implemented by the shared sales server—but Greenlist is an enhancement to this prior art that further reduces costs associated with authentication of transaction parties when physical assets are transacted (moved), not monetary or informational assets U.S. Pat. No. 7,117,227 covers the Object Name System (ONS) mechanism for cross-referencing electronic product codes (from RFID tags) to the internet addresses from which information about the tagged products can be retrieved. Pending application 2006/0011720 contains claims that will cover the Global Data Synchronization Network which has become the standard mechanism for providing product information from manufacturers to their trading partners.

Although particular embodiments of the invention have been described in detail for the purpose of illustration, it is to be understood that such detail is solely for that purpose and that variations can be made thereof by those skilled in the art without departing from the scope of the invention, which should be determined exclusively from the plain wording of the appended claims. Any details in the specification that are not included in the claims themselves should not be construed as limiting the scope of the invention.

We claim:

1. A system comprising:
   a first bank computer at a first bank, linked via a computer network to a payor's computer and a directory computer, said payor having at least one account at said first bank and having been authenticated to said first bank computer;
   wherein said directory computer is configured to maintain a first database of authenticated registrant information comprising authenticated information for a payee identifying via a publicly available identifier at least one linked credit account of said payee and to provide a portion of said first database via said computer network to said bank computer said portion comprising said authenticated information for said payee;
   wherein said first bank computer is configured to maintain a second database comprising data from said portion of said first database;
   wherein said first bank computer is configured to receive payment information from said payor computer identifying said payee via said registrant information, map said information identifying said payee to said linked credit account of said payee using said portion of said first database and said registrant information, and transmit a payment directly from said payor's at least one account at said first bank to said payee's linked credit account located at a second bank, without using an intermediary to transfer said payment; and
   wherein said second bank is obligated to reimburse said first bank for said payment if said payment information identifying said payee is inaccurate.

2. A system comprising:
   a first bank computer at a first bank linked via a computer network to a sender's computer and a directory computer, said sender having at least one asset account at said first bank and having been authenticated to said first bank computer;
   wherein said directory computer is configured to maintain a first database of authenticated registrant information comprising authenticated information for a receiver identifying via a publicly available identifier at least one linked account of said receiver and to provide a portion of said first database via said computer network to said bank computer, said portion comprising said authenticated information for said receiver;
   wherein said first bank computer is configured to maintain a second database comprising data from said portion of said first database;
   wherein said first bank computer is configured to receive information from said sender computer identifying said receiver via said registrant information, map said information identifying said receiver to said at least one linked account of said receiver using said portion of said first database and said registrant information, and implement an asset transfer directly from said sender's at least one account at said first bank to said receiver's at least one linked account located at a second bank, without using an intermediary to implement said asset transfer; and
   wherein said second bank is obligated to reimburse said first bank for said asset if said information from said sender computer identifying said receiver is inaccurate.

3. The system of claim 2. wherein said first bank is a licensee of said directory computer.

4. The system of claim 2, wherein said linked account is an identifier, encodable as a URN, of said receiver.

5. The system of claim 2, wherein said information identifying said receiver comprises information identifying said receiver.

6. The system of claim 2, wherein said asset transfer actually transfers an asset or transfers ownership thereof from said sender to said receiver.

7. The system of claim 2, wherein said asset is a payment or financial instrument.

8. The system of claim 2, wherein said asset is a digital construct.

9. The system of claim 2, wherein said asset is one or more physical objects.

10. The system of claim 2, wherein said asset is information, right or access permission.

11. The system of claim 2, wherein said linked credit account is a deposit only account.

* * * * *